US009632685B2

(12) United States Patent
Li

(10) Patent No.: US 9,632,685 B2
(45) Date of Patent: Apr. 25, 2017

(54) METHOD OF NAVIGATING THROUGH A MEDIA PROGRAM DISPLAYED ON A PORTABLE ELECTRONIC DEVICE IN A MAGNIFIED TIME SCALE

(71) Applicant: Eric Qing Li, Dallas, TX (US)

(72) Inventor: Eric Qing Li, Dallas, TX (US)

( * ) Notice: Subject to any disclaimer, the term of this patent is extended or adjusted under 35 U.S.C. 154(b) by 232 days.

(21) Appl. No.: 14/283,197

(22) Filed: May 20, 2014

(65) Prior Publication Data
US 2014/0258854 A1 Sep. 11, 2014

Related U.S. Application Data

(63) Continuation-in-part of application No. 13/485,308, filed on May 31, 2012, now Pat. No. 8,737,821.

(51) Int. Cl.
| | |
|---|---|
| *G06F 3/0485* | (2013.01) |
| *G11B 27/34* | (2006.01) |
| *H04N 5/783* | (2006.01) |
| *H04N 21/414* | (2011.01) |
| *H04N 21/472* | (2011.01) |
| *H04N 21/475* | (2011.01) |
| *H04N 21/485* | (2011.01) |
| *G06F 3/0488* | (2013.01) |

(52) U.S. Cl.
CPC .......... *G06F 3/04855* (2013.01); *G11B 27/34* (2013.01); *H04N 5/783* (2013.01); *H04N 21/414* (2013.01); *H04N 21/4753* (2013.01); *H04N 21/47217* (2013.01); *H04N 21/4858* (2013.01); *G06F 3/04883* (2013.01)

(58) Field of Classification Search
CPC ............. G11B 27/34; H04N 21/47217; H04N 21/8456; H04N 5/783; G06F 3/04855; G06F 3/016; G06F 3/0488
USPC ....................................................... 386/239
See application file for complete search history.

(56) References Cited

U.S. PATENT DOCUMENTS

| | | | | | |
|---|---|---|---|---|---|
| 5,526,022 | A | * | 6/1996 | Donahue ................. | G01C 9/20 324/253 |
| 6,922,816 | B1 | * | 7/2005 | Amin ................. | G06F 3/04847 715/732 |
| 7,725,828 | B1 | * | 5/2010 | Johnson ............... | G11B 27/005 715/719 |
| 8,737,821 | B2 | * | 5/2014 | Li .......................... | H04N 5/783 345/173 |
| 8,762,844 | B2 | * | 6/2014 | Kim ...................... | G11B 27/34 715/716 |
| 8,954,889 | B2 | * | 2/2015 | Fujibayashi .......... | G06F 3/0488 715/798 |

(Continued)

*Primary Examiner* — David Harvey

(57) ABSTRACT

A media program is displayed on a touch-sensitive screen of an electronic device. On the touch-sensitive screen, a scroll bar and an indicator are displayed. The indicator is configured to be moved along the scroll bar in a first direction or a second direction. A movement of the indicator in the first direction along the scroll bar causes the media program to be navigated forward in time, and a movement of the indicator in the second direction along the scroll bar causes the media program to be navigated backward in time. The indicator is moved along the scroll bar in one of the first and second directions in response to a user engagement of the touch-sensitive screen. The moving of the indicator comprises snapping the indicator to a predefined location on the scroll bar.

20 Claims, 27 Drawing Sheets

(56) References Cited

U.S. PATENT DOCUMENTS

| | | | | |
|---|---|---|---|---|
| 9,311,965 B2* | 4/2016 | Hwang | | |
| 2002/0063737 A1* | 5/2002 | Feig | ............... | G06F 3/04847 |
| | | | | 715/786 |
| 2008/0048878 A1* | 2/2008 | Boillot | ............... | G06F 3/017 |
| | | | | 340/686.1 |
| 2008/0094367 A1* | 4/2008 | Van De Ven | ......... | G06F 3/0414 |
| | | | | 345/173 |
| 2009/0199119 A1* | 8/2009 | Park | ............... | G06F 3/04847 |
| | | | | 715/765 |
| 2009/0282362 A1* | 11/2009 | Matsumoto | ......... | G06F 3/04855 |
| | | | | 715/787 |
| 2010/0045705 A1* | 2/2010 | Vertegaal | ........... | A47G 19/2227 |
| | | | | 345/661 |
| 2010/0245278 A1* | 9/2010 | Hosoda | ............... | G06F 3/04883 |
| | | | | 345/173 |
| 2010/0251151 A1* | 9/2010 | Alsbury | ............... | G06F 1/1626 |
| | | | | 715/765 |
| 2011/0145745 A1* | 6/2011 | Hyeon | ............... | G06F 3/04855 |
| | | | | 715/769 |
| 2011/0311059 A1* | 12/2011 | Le Mer | ............. | G06F 17/30775 |
| | | | | 381/17 |
| 2012/0042246 A1* | 2/2012 | Schwesinger | ........... | G06F 3/017 |
| | | | | 715/716 |
| 2012/0154661 A1* | 6/2012 | Shimada | ............... | G03B 21/14 |
| | | | | 348/333.1 |
| 2012/0304121 A1* | 11/2012 | Cahill | ............... | G06F 3/0481 |
| | | | | 715/815 |
| 2012/0308204 A1* | 12/2012 | Hwang | ............... | G06F 3/04847 |
| | | | | 386/241 |
| 2014/0210827 A1* | 7/2014 | Alsbury | ............... | G06T 11/206 |
| | | | | 345/440.2 |
| 2014/0258854 A1* | 9/2014 | Li | ............... | G11B 27/34 |
| | | | | 715/702 |

* cited by examiner

METHOD OF NAVIGATING THROUGH A MEDIA PROGRAM DISPLAYED ON A PORTABLE ELECTRONIC DEVICE IN A MAGNIFIED TIME SCALE

PRIORITY DATA

This application is a continuation-in-part of U.S. patent application Ser. No. 13/485,308, filed on May 31, 2012, entitled "AUTOMATIC TRIGGERING OF A ZOOMED-IN SCROLL BAR FOR A MEDIA PROGRAM BASED ON USER INPUT," which is issued as U.S. Pat. No. 8,737,821 on May 27, 2014, the disclosure of which is hereby incorporated by reference in its entirety.

BACKGROUND

Technical Field

The present disclosure generally relates to media playback control. More particularly, the present disclosure relates to a method of navigating through a media program, such as a video playing on an electronic device, in response to user input.

Related Art

Traditionally, consumers have been consuming media content such as movies (or other types of videos) by going to a movie theater or by watching media programs on television (TV). For example, a consumer may rent or buy a movie on a cassette tape or a DVD disk and then play the movie on TV using a video cassette player or a DVD player.

In recent years, the rapid advances in computer technology and broadband telecommunications have enabled media content to be played on portable electronic devices such as tablet computers or mobile telephones. For example, a consumer can download a movie to his portable electronic device and subsequently play the movie on the portable electronic device. As another example, the consumer can also watch the movie by streaming the movie to his portable electronic device from a remote computer server. These new ways of consuming media content on a portable electronic device offer convenience and simplicity for the consumers. Nevertheless, existing methods and apparatuses for consuming media content via portable electronic device still have drawbacks. For example, they may not offer sufficient media playback control functionalities for a user.

Therefore, while existing methods and apparatuses for consuming media content via a portable electronic device have been generally adequate for their intended purposes, they have not been entirely satisfactory in every aspect. It would be advantageous to offer enhanced media playback control functionalities for a user.

SUMMARY

One of the broader forms of the present disclosure involves an electronic device. The device involves: a touchscreen configured to receive gestured-based input from a user; a memory storage component configured to store computer programming code; and a computer processor configured to execute the computer programming code to perform the following: displaying a media program on the touch screen; detecting, via the touch screen, the gesture-based input from the user indicating that the user wishes to fast forward or rewind the media program; and triggering, in response to the detected input from the user, an appearance of a scroll bar including an indicator on the touch screen; wherein: the indicator is configured to be moved along the scroll bar; a length of the scroll bar represents a predefined amount of time that is a fraction of a total duration of the media program; and a position of the indicator relative to the scroll bar corresponds to a time location of the media program.

Another one of the broader forms of the present disclosure involves a method of managing media playback. The method includes: displaying a media program on a touch screen of an electronic device; detecting, via the touch screen, an input from a user indicating that the user wishes to fast forward or rewind the media program; and triggering, in response to the detected input from the user, an appearance of a scroll bar including an indicator on the touch screen; wherein: the indicator is configured to be moved along the scroll bar; a length of the scroll bar represents a predefined amount of time that is a fraction of a total duration of the media program; and a position of the indicator relative to the scroll bar corresponds to a time location of the media program.

Yet another one of the broader forms of the present disclosure involves a system for playing digital media. The system includes: a computer database configured to electronically stores a plurality of media programs each in a digital format; and a user interface module installed on a portable touch screen electronic device located remotely from the computer database, wherein the portable touch screen electronic device is configured to communicate with the computer database via a wireless or wired telecommunications protocol, and wherein the user interface module contains computer programming instructions, that when executed, perform the following tasks: displaying a media program on a touch screen of an electronic device; detecting, via the touch screen, an input from a user indicating that the user wishes to fast forward or rewind the media program; and triggering, in response to the detected input from the user, an appearance of a scroll bar including an indicator on the touch screen; wherein: the indicator is configured to be moved along the scroll bar; a length of the scroll bar represents a predefined amount of time that is a fraction of a total duration of the media program; and a position of the indicator relative to the scroll bar corresponds to a time location of the media program.

Another aspect of the present disclosure involves a method. A media program is displayed on a touch-sensitive screen of an electronic device. On the touch-sensitive screen, a scroll bar and an indicator are displayed. The indicator is configured to be moved along the scroll bar in a first direction or a second direction. A movement of the indicator in the first direction along the scroll bar causes the media program to be navigated forward in time, and a movement of the indicator in the second direction along the scroll bar causes the media program to be navigated backward in time. The scroll bar is associated with a first time scale. A user engagement with the touch-sensitive screen is detected. The user engagement includes one of: a sliding of a finger or a stylus on the touch-sensitive screen, wherein at least a part of the sliding is performed at a non-zero angle with respect to the scroll bar; or a continuous wrap-around gesture that includes at least a first directional component and a second directional component opposite from the first directional component. In response to the detected user engagement, the media program is navigated in a second time scale that is more magnified than the first time scale.

Another aspect of the present disclosure involves a method. A media program is displayed on a touch-sensitive screen of an electronic device. On the touch-sensitive screen, a first scroll bar and an indicator are displayed. The indicator is configured to be moved along the first scroll bar in a first direction or a second direction. A movement of the indicator in the first direction along the first scroll bar causes the media program to be navigated forward in time, and a movement of the indicator in the second direction along the first scroll bar causes the media program to be navigated backward in time. A multi-touch user engagement is detected with the touch-sensitive screen. In response to the detected multi-touch user engagement, a second scroll bar is displayed on the touch-sensitive screen. The second scroll bar has a magnified time scale compared to the first scroll bar.

Another aspect of the present disclosure involves a method. A media program is displayed on a touch-sensitive screen of an electronic device. On the touch-sensitive screen, a scroll bar and an indicator are displayed. The indicator is configured to be moved along the scroll bar in a first direction or a second direction. A movement of the indicator in the first direction along the scroll bar causes the media program to be navigated forward in time, and a movement of the indicator in the second direction along the scroll bar causes the media program to be navigated backward in time. The indicator is moved along the scroll bar in one of the first and second directions in response to a user engagement of the touch-sensitive screen. The moving of the indicator comprises snapping the indicator to a predefined location on the scroll bar.

DETAILED DESCRIPTION

Figure 1:
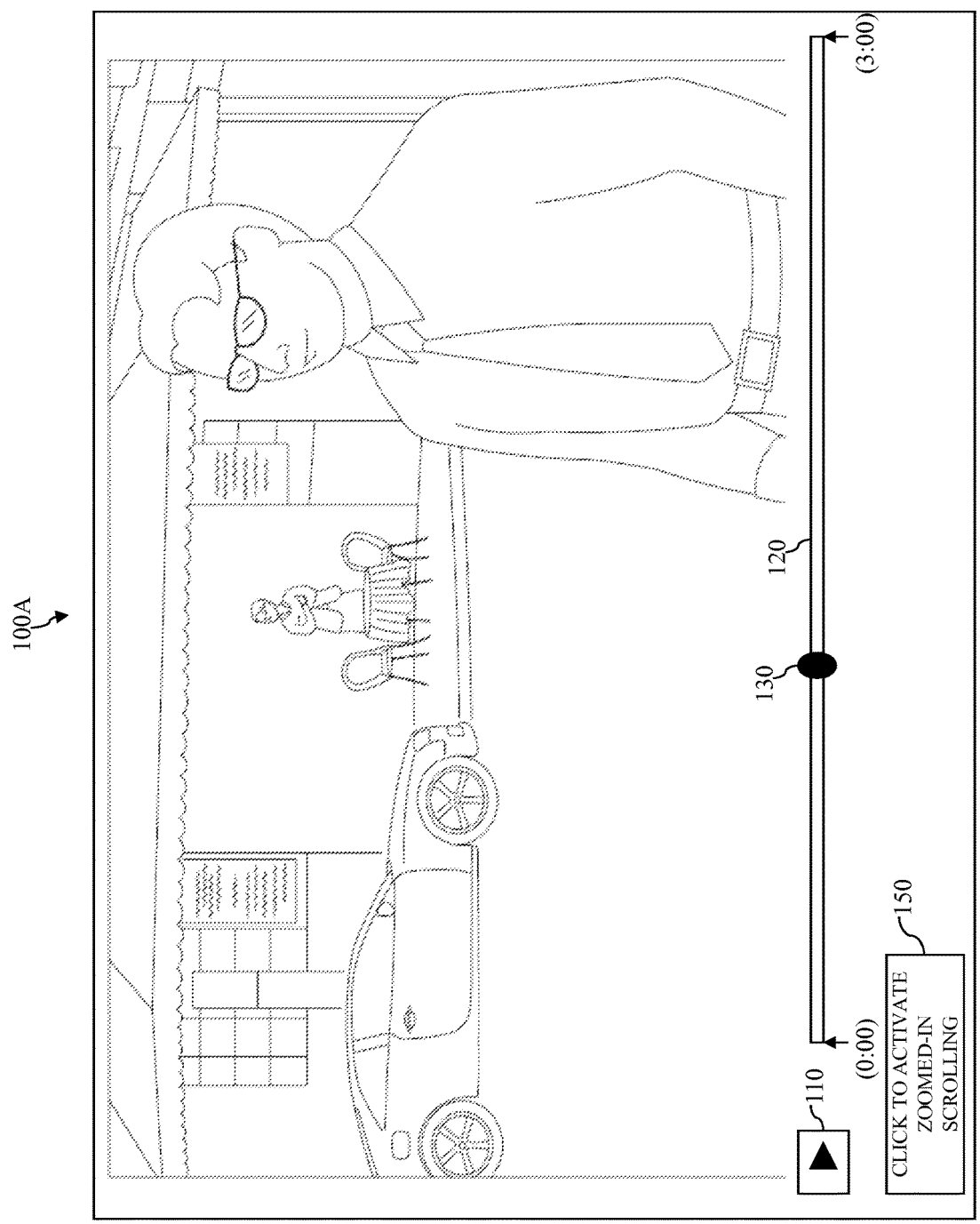
FIGS. 1-20 are example screen shots of various embodiments of user interfaces for displaying and navigating through a media program according to various aspects of the present disclosure.

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity. In addition, the present disclosure may repeat reference numerals and/or letters in the various examples. This repetition is for the purpose of simplicity and clarity and does not in itself dictate a relationship between the various embodiments and/or configurations discussed Consumers have traditionally been consuming media content by watching TV or by going to a movie theater. Recently, rapid advances in computer technology and broadband telecommunications have enabled media content to be consumed on portable electronic devices such as tablet computers or mobile telephones. For example, a consumer can download a media program such as a movie to his portable electronic device and subsequently play the movie on the portable electronic device. As another example, the consumer can also watch the movie by streaming the movie to his portable electronic device from a remote computer server. These new ways of consuming media content on a portable electronic device offer convenience for the consumer (also interchangeably referred to as a user thereafter).

Nevertheless, existing methods and apparatuses of consuming media content via portable electronic device still have drawbacks. One such drawback is that they may not offer sufficient media playback control functionalities for a user. For example, it may not be easy for a user to perform navigational tasks on a portable electronic device, especially if the electronic device is relatively small (for example, if the portable electronic device is a mobile telephone or an undersized tablet computer).

According to the various aspects of the present disclosure, a method and apparatus for enhanced user navigation through a media program is disclosed, as discussed in more detail below.

Figure 2:
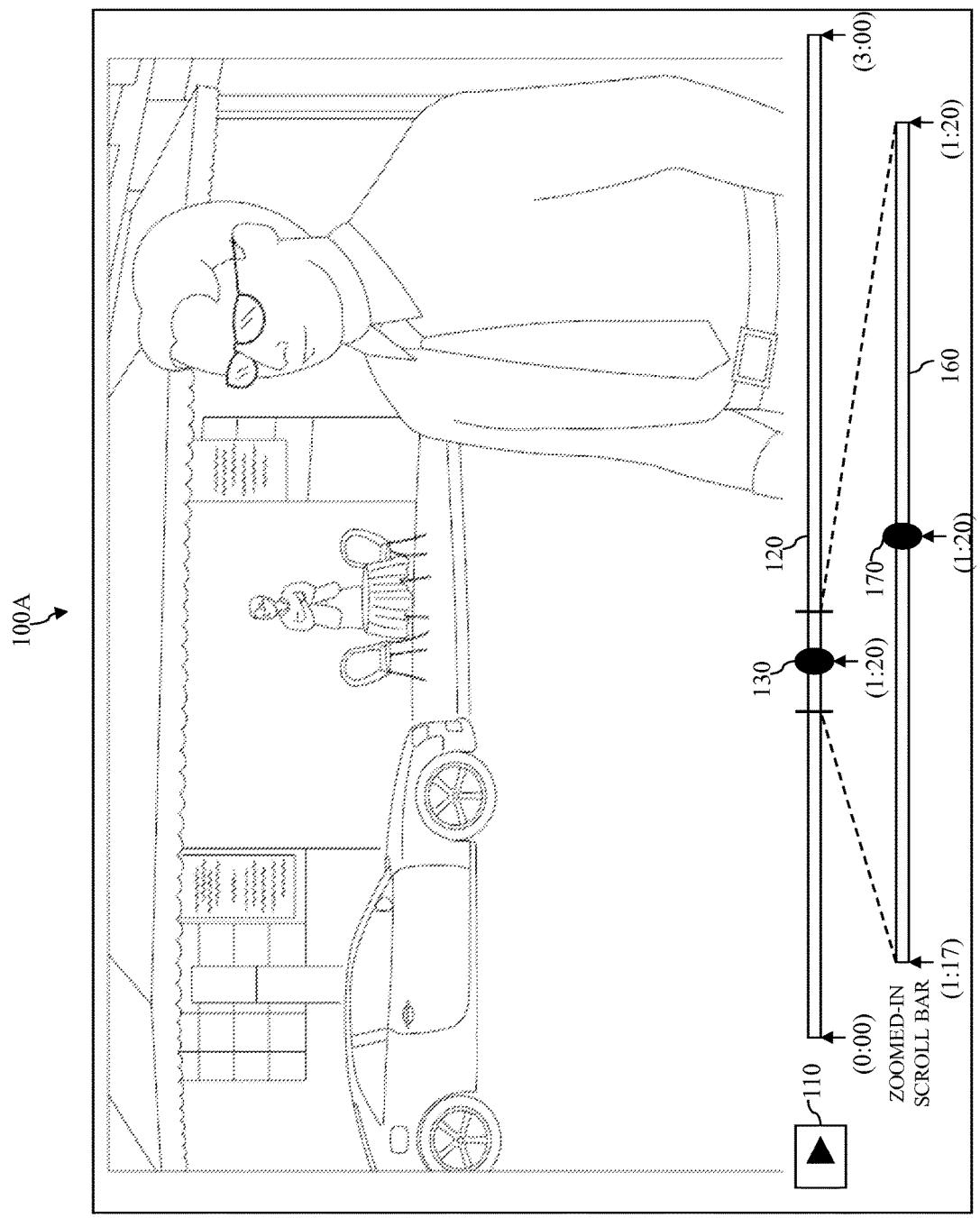

FIGS. 1-2 are various screenshots of a user interface 100A displaying a media program on a portable electronic device according to various aspects of the present disclosure. In various embodiments, the portable electronic device may include tablet computers (for example, APPLE's® IPAD® or various ANDROID® or WINDOWS® powered tablets) or mobile telephones (for example, APPLE's® IPHONE® or various ANDROID® or WINDOWS® powered smartphones). In some other embodiments, the portable electronic device may include computer monitor displays for desktop or laptop computers. In yet other embodiments, the portable electronic device may include controllers for television sets. In some embodiments, the portable electronic device may include a touch-sensitive display (or touch screen) via which the media program may be played. However, it is understood that the various aspects of the present disclosure may apply to a non-touch screen display as well. For example, whereas a touch screen device may detect user input via sensing the contact and the movement of the user's fingers on the touch screen, a non-touch screen device may detect user input via more traditional mechanisms such as a mouse, a keyboard, or voice control.

In various embodiments, the media program may include movies, documentaries, music videos, podcasts, soundtracks, educational programs, sporting events, artistic performances, or any other type of suitable audio/video digital file that can be played on the portable electronic device. In some embodiments, the consumer or user may download the media program to the portable electronic device from a remote server hosted/owned/operated by a media content provider or partner of the media content provider. For example, the media program may be downloaded from APPLE's® ITUNES®, THE APP STORE® from APPLE®, ANDROID's® PLAY STORE®, AMAZON's® INSTANT VIDEO® store, MICROSOFT's® WINDOWS STORE®, RESEARCH IN MOTION's® APP WORLD®, or from a suitable media download service from another service provider. After the media program is downloaded to a local storage of the portable electronic device, the user may then play the media program on the portable electronic device.

In some other embodiments, the user may acquire the media program by digitally converting a legally-owned copy of the media program to a digital file that can be stored on the portable electronic device. For example, the user may use a computer software program to convert a legally-owned DVD copy of a movie into a digital file, and then transfer the digital file of the movie onto the local storage of the portable electronic device.

In yet other embodiments, the user may stream the media program from a remote computer server without having to download the media program in its entirety. For example, service providers such as NETFLIX®, AMAZON®, HULU®, COMCAST®, VUDU®, and REDBOX® may each offer various types of video streaming services for their subscribing members. A user who is a member of these services may log on to the web site (or launch an "app") of the service provider and thereafter select a desired media program to be played. A play request from the user may be then sent to the remote server of the service provider, for example over a suitable wired or wireless telecommunications protocol. After verifying the user's identity and account information, the service provider may then allow the user to stream the media program by continuously sending digital packets to a portable electronic device of the user over the suitable telecommunications protocol. In some embodiments, this type of media content streaming may allow the portable electronic device to build up a "buffer" on a local storage of the portable electronic device, where the buffer may include a portion of the media program. The media program streaming may then be done by retrieving digital content from the buffer, which may be constantly updated.

Referring to FIG. 1, a screenshot of a user interface 100A for displaying and navigating through a media program is shown. The user interface 100A displays a scene from a media program (for example a movie) on the portable electronic device discussed above. The interface 100A may contain virtual on-screen controls such as a play/pause button 110, a scroll bar 120, and a position indicator 130. In some embodiments, these virtual on-screen controls are displayed as the media program is being played. In other embodiments, the display of these virtual on-screen controls can be normally hidden, but their display may be triggered by an appropriate user input. Such user input may be gesture-based, such as a user's tap on the touch screen of the portable electronic device. Such user input may also be voice-based, for example via a suitable voice command from the user.

The play/pause button 110 may be used to play or pause the media program. The scroll bar 120 and the position indicator 130 may be collectively used to perform navigational tasks through the media program. In more detail, the length of the scroll bar 120 may represent a total duration of the media program (for example, 3 hours for a 3-hour movie). The location of the position indicator 130 on the scroll bar 120 indicates a time location of the present scene of the media program being displayed (with respect to the media program as a whole).

The indicator 130 may be moved along the scroll bar 120 in a left direction or a right direction to accomplish certain navigational tasks. For example, a movement of the indicator 130 in the left direction results in a rewinding of the media program, whereas a movement of the indicator 130 in the right direction results in a fast forwarding of the media program. The movement of the position indicator 130 may be accomplished by a user gesture, for example a user using his finger(s) to "drag" the indicator 130 to various locations along the scroll bar 120. Although not specifically illustrated for reasons of simplicity, the interface 100A may also contain other virtual on-screen controls such as volume controls, subtitle displays, mute/unmute, screen resizing, exit media playback, etc.

In certain situations, the above method of performing navigational tasks through the media program may be inadequate or unsatisfactory to the user. As an example, if the media program is long—such as a lengthy movie—a relatively small movement of the position indicator 130 may lead to a relatively large shift in time. This may be undesirable for the user. For example, suppose the user wishes to merely fast forward or rewind through the media program by one or two minutes, or a fraction of a minute, so that he may get a quick preview of what is about to happen in the movie, or he may re-watch a scene that just occurred very recently. To do so, the user may attempt to use his finger(s) to drag the position indicator 130 to the right or left on the scroll bar 120 by what he deems to be a small amount, which may be just a few millimeters. Nevertheless, if the media program is long in duration, even such small amounts of locational shift of the position indicator 130 may result in a larger-than-expected time shift of the media program, for example a time shift of tens of minutes or more. Now the media program is navigated to a scene that is unexpected for the user, and the user may not know how far to go back (or forward). In other words, the user may not be able to quickly return to the initial media program location.

Furthermore, the user may not be able to control the locational shift of the position indicator 130 as precisely as he would like. What often happens is that the user may inadvertently move the position indicator 130 by an amount much larger than intended, thereby causing the media program to jump into a time location that is even farther away than desired. As an example, the user may intend to drag the position indicator 130 to the right by only one millimeter or so, in an effort to fast forward by perhaps a few minutes. However, in actuality, the user may end up dragging the position indicator 130 by five to ten millimeters to the right, thereby causing the media program to skip forward by twenty minutes. These types of problems are even more likely to occur if the user has large hands or fingers, or as the user becomes older and therefore loses precise muscle control. This program is further exacerbated as the screen size of the portable electronic device shrinks, since now a small shift in location of the position indicator 130 leads to an even greater shift in time of the media program. What likely results is a frustrating navigational experience for the user.

According to various aspects of the present disclosure, the user interface 100A allows the user to have enhanced navigational media playback control. In one embodiment, as illustrated in FIG. 1, the user interface 100A contains a virtual icon/button 150. In some embodiments, the display of the icon/button 150 may be triggered along with the display of the other virtual on-screen controls, such as the play/pause button 110, the scroll bar 120, and the position indicator 130.

The virtual icon/button 150 may alert the user that a click or press of the icon/button 150 will lead to enhanced navigation. For example, in the embodiment shown in FIG. 1, the icon/button 150 may display a message such as "click to activate zoomed-in scrolling." In alternative embodiments, the icon/button 150 may not be explicitly displayed outright. Rather, it may be invoked by a detected suitable user gesture, for example by a detected user click or press of the position indicator 130, or by a user voice command. The display of the icon/button 150 may or may not be concurrent with the display of the other on-screen controls such as the scroll bar 120 and the position indicator 130.

Referring now to FIG. 2, the clicking or pressing of the icon/button 150 triggers the interface 100A to display a different scroll bar 160 and another position indicator 170 on the portable electronic device. The scroll bar 160 represents a fraction of the duration of the media program. Stated differently, the scroll bar 160 is a "zoomed-in" version of the scroll bar 120 with respect to time. For example, the total length of the scroll bar 160 may correspond to 1/30 of the total duration of the media program. Thus, if the total duration of the media program is 3 hours, then the total length of the scroll bar 160 corresponds to only 6 minutes of the media program. In some embodiments, the amount of time corresponding to the scroll bar 160 is evenly divided to include an amount of time before the present scene of the media program and an amount of time after the present scene of the media program.

Using the above example, suppose the present scene is at a time location (represented by the location of the position indicator 130) of 1 hour and 20 minutes into the 3-hour media program, then the scroll bar 160 (which has a total time duration of 6 minutes) represents the time from 3 minutes before the 1 hour and 20 minutes, to 3 minutes after the 1 hour and 20 minutes. Thus, the scroll bar represents the time from 1 hour and 17 minutes to 1 hour and 23 minutes. In other words, the beginning of the scroll bar 160 is at the 1 hour and 17 minutes mark of the media program, and the end of the scroll bar 160 is at the 1 hour and 23 minutes mark of the media program.

Similar to the position indicator 130, the position indicator 170 may be moved along the scroll bar 160 to perform navigational tasks. In some embodiments, the position indicator 130 moves along "in sync" with the position indicator 170. In some embodiments, an initial position of the position indicator 170 is at the center or middle of the scroll bar 160—i.e., at 1 hour and 20 minutes into the 3-hour media program using the example discussed above. A movement of the position indicator 170 in the left direction results in rewinding of the media program, whereas a movement of the position indicator in the right direction results in fast forwarding of the media program.

Since the scroll bar 160 corresponds to only a fraction of the total duration of the media program, moving the position indicator 170 along the scroll bar 160 leads to more precise navigational control. For example, instead of risking a greater-than-expected jump forward or backwards (for example, a jump of 10-15 minutes) by moving the position indicator 130 just a few millimeters, the same amount of locational shift of the position indicator 170 may now cause the media program to fast forward or rewind just a few minutes or fractions of a minute. In other words, the "zoomed-in" scroll bar 160 allows the user to have finer control of the playback of the media program.

To enhance the navigational experience for the user, the fast forwarding or rewinding of the media program corresponding to the movement of the position indicator 170 along the scroll bar 160 may be accompanied by a continuous display of scenes of the media program corresponding to the location of the position indicator 170. In other words, as the position indicator 170 is dragged along the scroll bar 160, the scene of the media program is continuously updated to reflect the (new) current location of the position indicator 170. In this manner, the user can "slowly" navigate the media program to a desired time location without risking missing a desired scene.

As shown in FIG. 2, the respective time information associated with the position indicators 130/170 as well as the beginning and the end of the scroll bars 120/160 may also be displayed in the user interface 100A. Such detailed time information displayed in the user interface 100A further assists the user's navigation of the media program.

Figure 3:
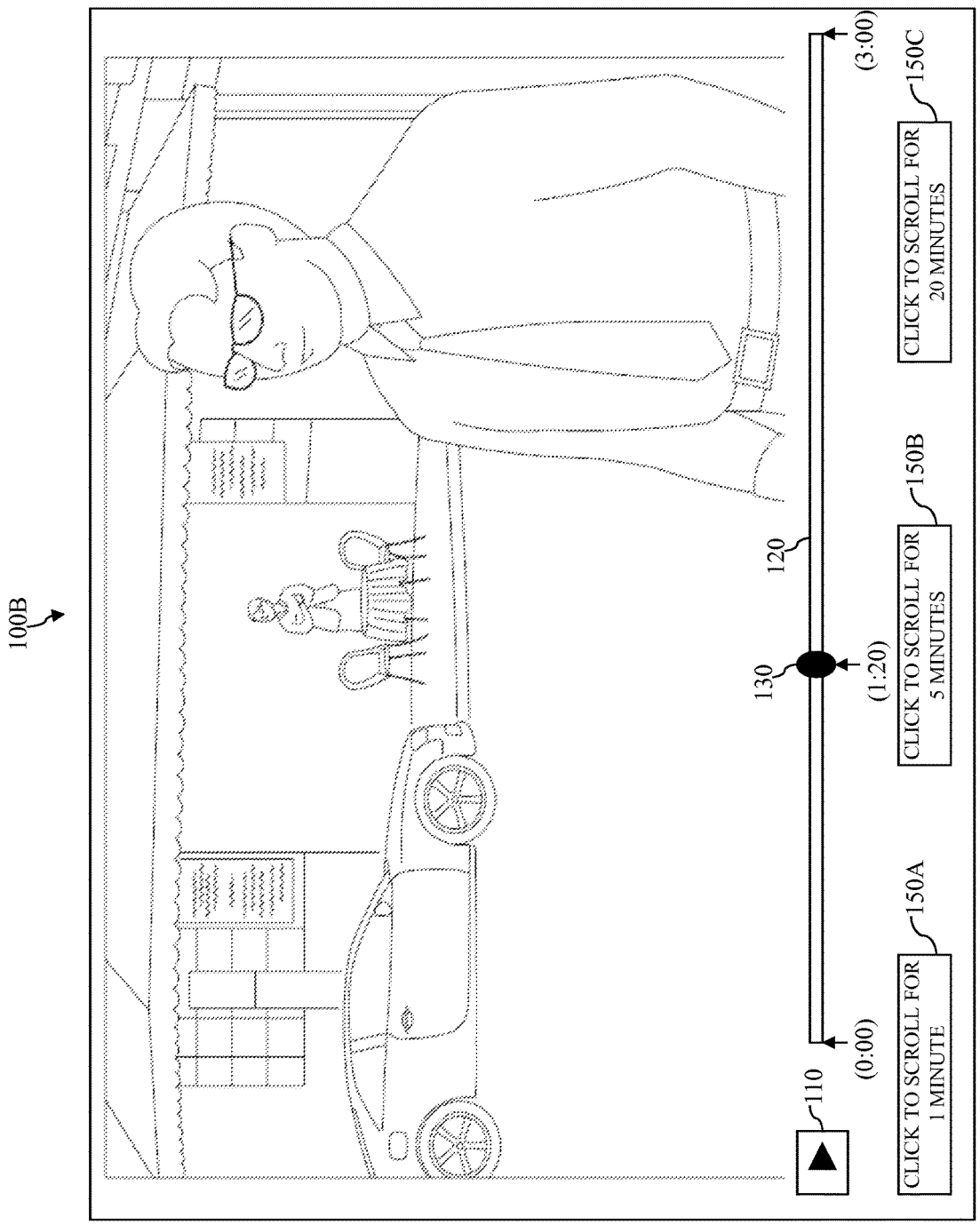
Figure 4:
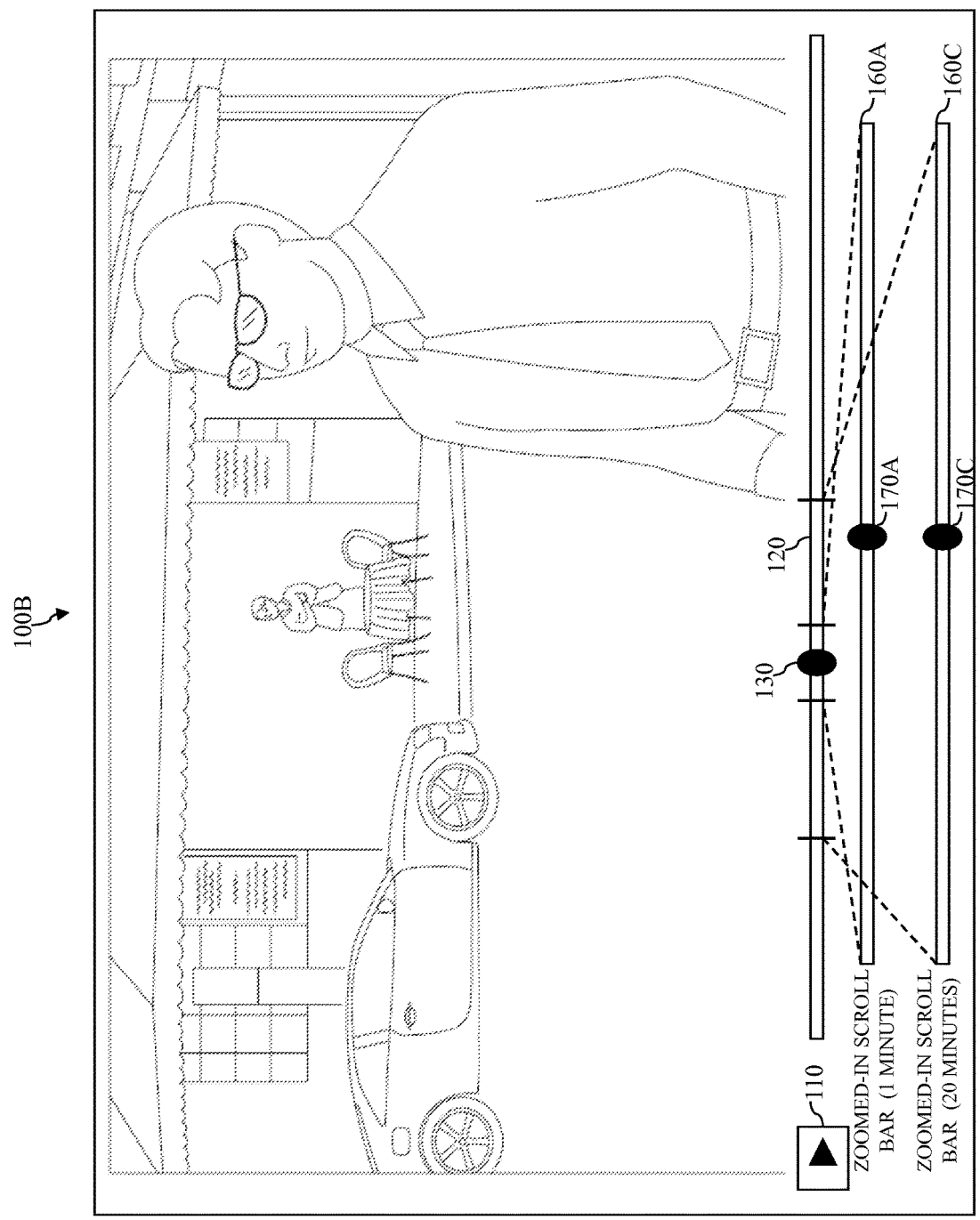

FIGS. 3-4 are screenshots of an alternative embodiment of a user interface 100B displaying a media program on a portable electronic device according to various aspects of the present disclosure. Referring to FIG. 3, a plurality of virtual icons/buttons 150 may be displayed in the user interface 100B. As an example, three of such virtual icons/buttons 150A, 150B, and 150C are shown. These icons/buttons 150A-150C may each be interactively activated by the user in a manner similarly to the icon/button 150 (shown in FIG. 1) to trigger the "zoomed-in" scrolling as discussed above. However, the icons/buttons 150A-150C herein may each correspond to a different time scale.

For example, if the icon/button 150A is clicked or pressed, a "zoomed-in" scroll bar similar to the scroll bar 160 (shown in FIG. 2) may be triggered, but this scroll bar triggered herein may correspond to only 1 minute of the media program. On the other hand, if the icon/button 150B is clicked or pressed, another "zoomed-in" scroll bar corresponding to 5 minutes of the media program may be triggered. If the icon/button 150C is clicked or pressed, yet another "zoomed-in" scroll bar corresponding to 20 minutes of the media program may be triggered. In various embodiments, the amount of time corresponding to each scroll bar may be set by the user. For example, a long press of each the icons/buttons 150A-150C may bring up another interactive virtual mechanism, such as a spin-able wheel or a text input field. The user may "spin the wheel" to increase or decrease the length of time corresponding to the respective scroll bar, or the user may just directly input such length of time into the text field.

In certain embodiments, these differently-time-scaled scroll bars may be triggered one at a time. In other embodiments, two or more of these differently-time-scaled scroll bars may be triggered simultaneously. For example, as shown in FIG. 4, the displays of the scroll bars 160A/160C and position indicators 170A/170C are both triggered by a detected clicking of the icons/buttons 150A/150C, respectively. The user may perform navigational tasks by either moving the position indicator 170A along the scroll bar 160A, or by moving the position indicator 170C along the scroll bar 160C.

The simultaneous display of multiple scroll bars (and their respective position indicators) allows for enhanced and more granular media playback control. For example, the user may perform a more "rapid" navigation by using the less "zoomed-in" scroll bar 160C first, so that an approximate time location may be identified. Thereafter, the user may perform a "slower" navigation by using the more "zoomed-in" scroll bar 160A, to zero-in on the exact desired scene. In other words, the embodiment illustrated in FIG. 4 allows the user to perform a "coarse" navigation followed by a "fine" navigation in order to find the desired scene efficiently.

Figure 5:
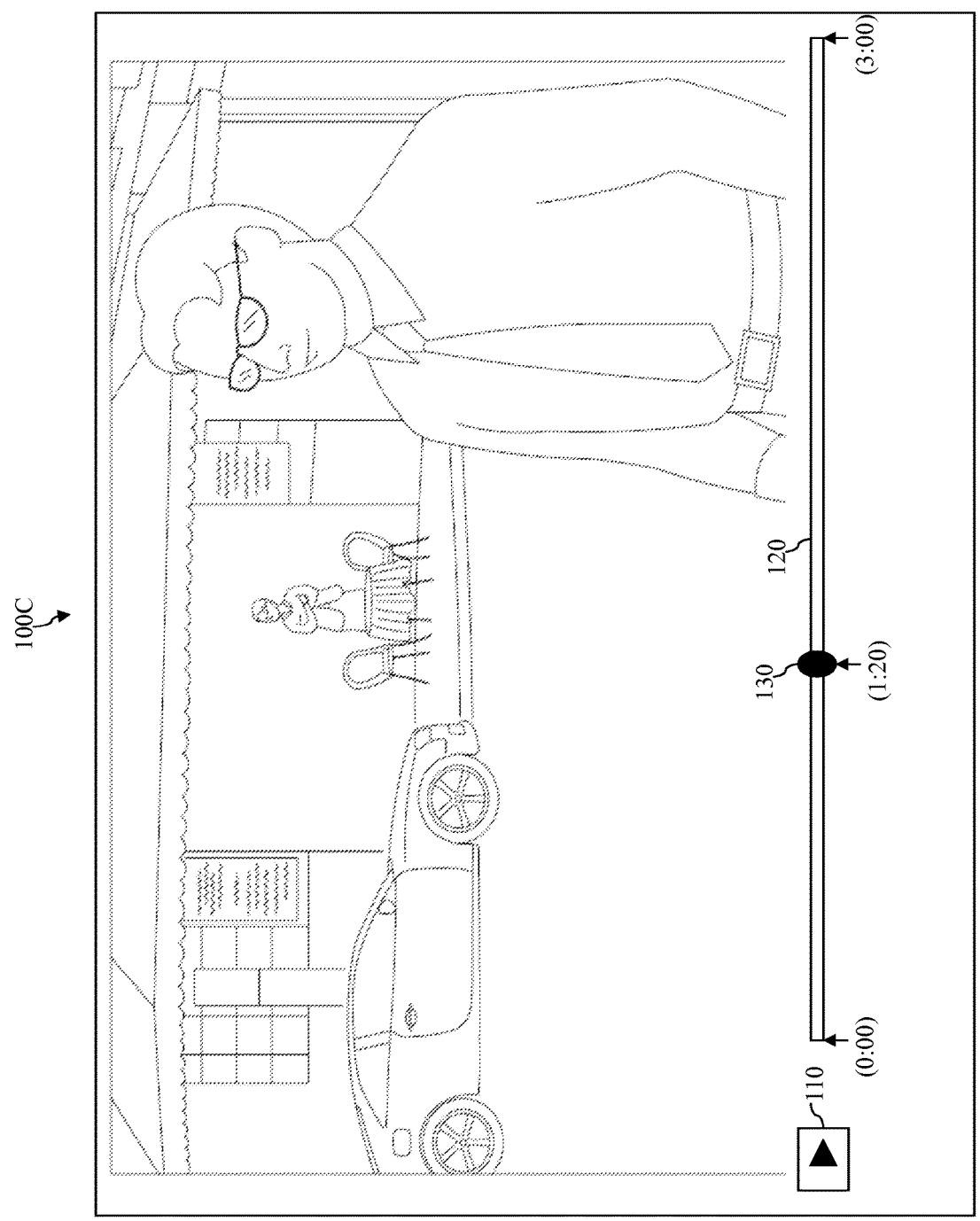

Though the embodiments discussed above and shown in FIGS. 1-4 trigger the "zoomed-in" scroll bar(s) 160 by detecting a user click of an icon/button 150, it is understood that other mechanisms may be employed to trigger the scroll bar(s) 160 as well. For example, referring to FIG. 5, an alternative embodiment of user interface 100C need not use any specific icons/buttons to trigger the "zoomed-in" scroll bar. Rather, a "zoomed-in" scroll bar may be conditionally triggered in response to a detected movement speed of the position indicator 130 along the scroll bar 120.

In more detail, the user interface 100C may predefine a reference speed for the position indicator 130. For example, the reference speed may be predefined to be X millimetersper-second, which may be automatically programmed within the user interface 100C or may be manually defined by the user (for example, in a "settings" menu of the user interface 100C). The detected movement speed of the position indicator 130 (in response to user input) along the scroll bar 120 is compared with the reference speed. If the detected movement speed of the position indicator is less than the reference speed, that indicates that the user wishes to navigate through the media program slowly in order to find a desired scene of the media program. Consequently, a "zoomed-in" scroll bar similar to the scroll bar 160 shown in FIG. 2 may be triggered to allow the user perform navigational tasks in a "zoomed-in" time scale associated with such scroll bar.

On the other hand, if the detected movement speed of the position indicator 130 is greater than the reference speed, that indicates that the user wishes to navigate through the media program quickly and therefore does not need the "zoomed-in" scroll bar such as the scroll bar 160 shown in FIG. 2. Consequently, no such "zoomed-in" scroll bar will be triggered, and the user may perform navigational tasks in a "regular" time scale associated with the scroll bar 120 of FIG. 5. In the manner discussed above, the embodiment of the user interface 100C shown in FIG. 5 determines the needs of the user in response to a detected gesture-based input from the user, and thereafter finds an appropriate navigation environment for the user automatically.

It is understood that the embodiment discussed above with reference to FIG. 5 need not be restricted to just one reference speed. Instead, the user interface 100C may define (or allow the user to define) a plurality of reference speeds. The actual detected movement speed of the position indicator 130 is compared with these multiple reference speeds so as to find a most suitable "zoomed-in" scroll bar (or non-at-all) for the user to perform the navigation of the media program. For example, the user interface 100C may predefine three reference speeds: speed 1, speed 2, and speed 3, where speed 1<speed 2<speed 3. If the detected actual movement speed of the position indicator 130 is less than speed 1, that may indicate that the user wishes to perform navigation at a slowest (or finest) pace. Consequently, a first scroll bar having a smallest (or most "zoomed-in") time scale may be triggered. For example, the first scroll bar may be associated with a time scale of 1 minute.

If the detected actual movement speed of the position indicator 130 is greater than speed 1 but less than speed 2, that may indicate that the user wishes to perform navigation at a somewhat-slow-but-not-too-slow pace. Consequently, a second scroll bar having a time scale that is greater than the time scale associated with the first scroll bar may be triggered. For example, the second scroll bar may be associated with a time scale of 5 minutes.

If the detected actual movement speed of the position indicator 130 is greater than speed 1 and speed 2 but less than speed 3, that may indicate that the user wishes to perform navigation at a pace that is just slightly slower than normal. Consequently, a third scroll bar having a time scale that is greater than the time scales associated with the first and second scroll bars may be triggered. For example, the third scroll bar may be associated with a time scale of 20 minutes.

If the detected actual movement speed of the position indicator 130 is greater than the reference speed 3, that may indicate that the user wishes to perform navigation at a regular pace. Consequently, no "zoomed-in" scroll bar is triggered. The user may instead perform navigation on a scroll bar like the scroll bar 120, which has a time scale equal to the entire duration of the media program.

Figure 6:
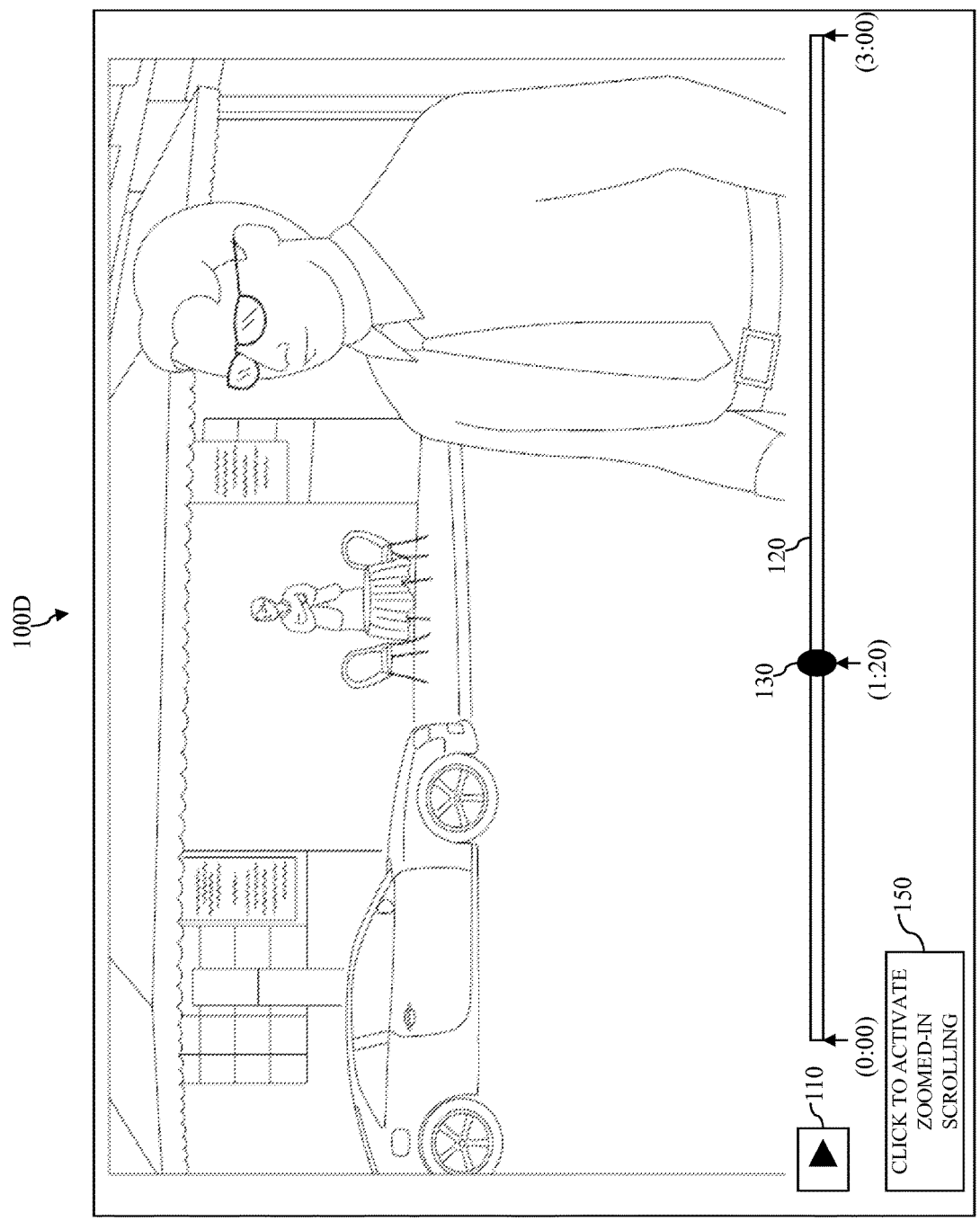

The embodiments of the user interface 100 discussed above with reference to FIGS. 1-5 involve triggering the display of a "zoomed-in" scroll bar (for example the scroll bar 160) that is separate from a "main" scroll bar (for example the scroll bar 120). However, it is understood that the concepts discussed above may apply also to a user interface without triggering a separate "zoomed-in" scroll bar. Referring to FIG. 6, the user interface 100 may appear substantially the same as the user interface 100A at this stage. In other words, the user interface 100D may include a "regular" scroll bar 120 and a position indicator 130 located thereon, as well as a virtual icon/button 150 that informs the user that "zoomed-in" scrolling is available and can be activated.

Figure 7:
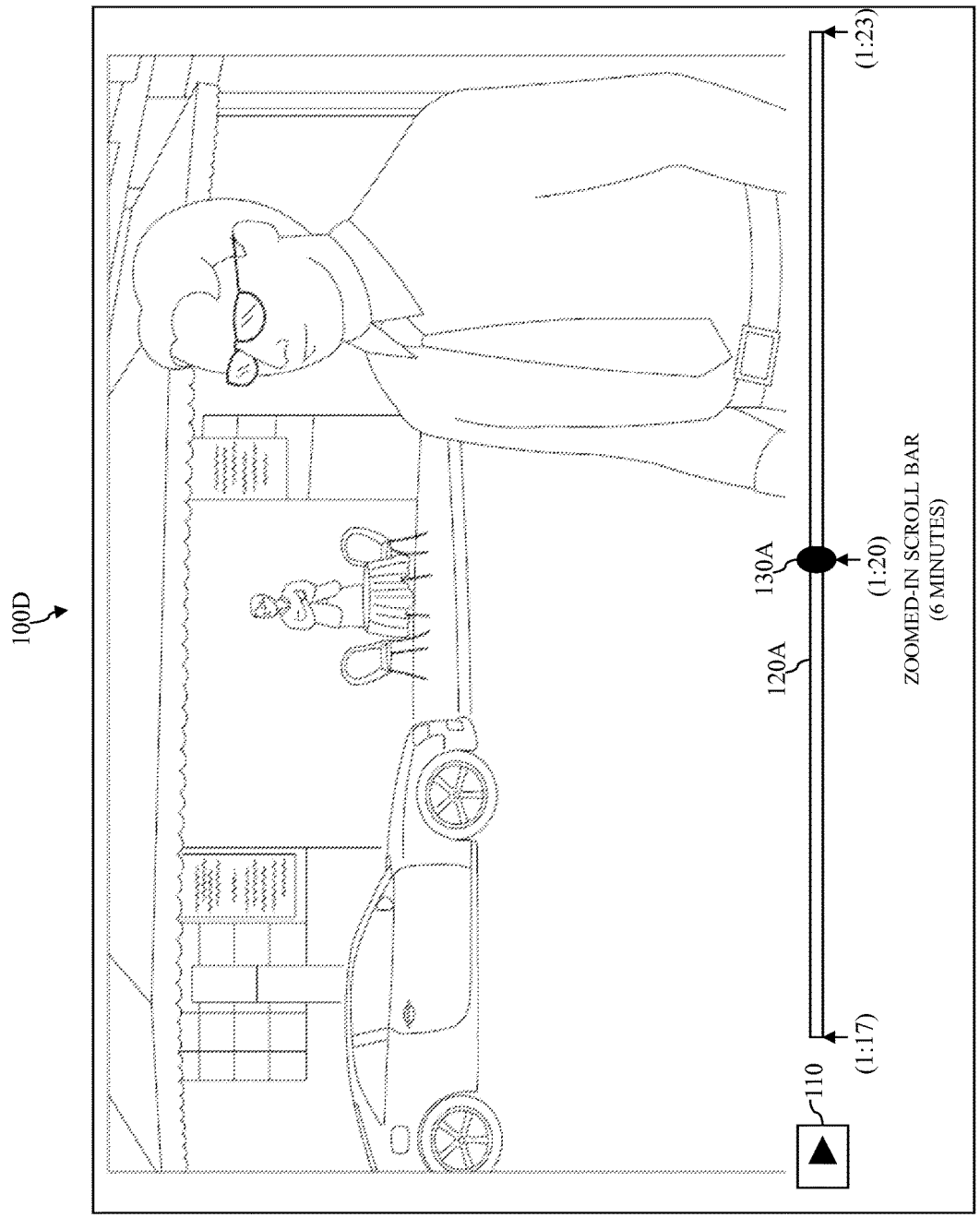

Once the user interface 100D detects that the user has clicked on the icon/button 150, it will display a different stage of the user interface 100D, as illustrated in FIG. 7. As is shown in FIG. 7, rather than showing a "zoomed-in" scroll bar separate from the "regular" scroll bar 120, the user interface 100D replaces the scroll bar 120 with a "zoomed-in" version of itself, designated as a scroll bar 120A (which contains a position indicator 130A). In other words, whereas the regular scroll bar 120 corresponds to a time scale equal to a total duration of the media program (3 hours, for example), the zoomed-in version 120A corresponds only to a fraction of the time scale (6 minutes, for example). In some embodiments, the position indicator 130A is initially placed at the center of the scroll bar 120A. The user may once again perform fine navigational tasks using the zoomed-in scroll bar 120A and the position indicator 130A. A movement of the position indicator 130A to the left results in a rewinding of the media program, and a movement of the position indicator 130A to the right results in a fast forwarding of the media program.

It is understood that the user interface 100D FIG. 7 may incorporate other aspects of the user interfaces 100A-100C discussed above to arrive at various other alternative embodiments. For example, in one embodiment, multiple virtual icons/buttons similar to those shown in FIG. 3 may be employed by the user interface 100D, so as to offer the user an option to choose a desired zoomed-in time scale to perform navigational tasks. As another example, in another embodiment, depending on the actual detected movement speed of the position indicator 130A, zoomed-in scroll bars 120A corresponding to different time scales may be triggered to replace the regular scroll bar 120, in a manner similar to the concepts discussed above with reference to the user interface 100C of FIG. 5.

Figure 8:
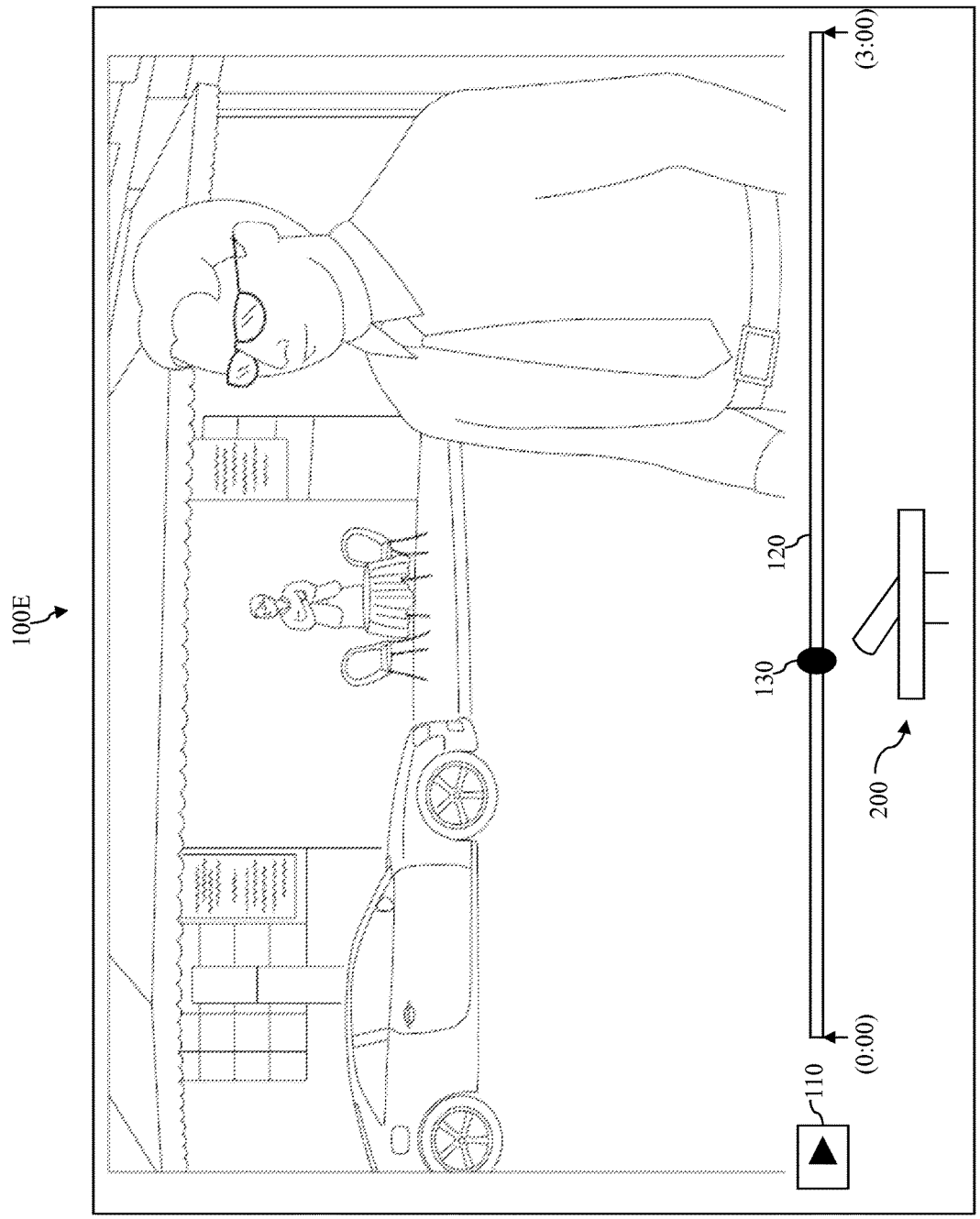

FIG. 8 shows a screenshot of a user interface 100E according to another alternative embodiment of the present disclosure. In this embodiment, the user interface 100E employs a virtual toggle 200 to carry out navigation tasks. The virtual toggle 200 can be flipped in the left direction, which results in a rewinding of the media program. The virtual toggle 200 can be flipped in the right direction, which results in a fast forwarding of the media program. The degree (i.e., the amount of tilt) in which the toggle 200 is flipped in either direction corresponds to the speed in which the media program is fast forwarded or rewound. Thus, if the user wishes to navigate through the media program rapidly, he can flip the toggle 200 and hold it in an extreme tilt angle. For example, the tilt angle of the toggle may approach 90 degrees, where a vertical line would correspond to a 0 degree. On the other hand, if the user wishes to navigation through the media program more slowly, he can flip the toggle 200 and hold it in a subtle tilt angle. For example, the tilt angle of the toggle may not deviate much from the 0 degree. The user interface 100E is configured to continuously monitor the amount of tilt of the toggle 200. As the user changes the amount of tilt of the toggle, the user interface 100E will either increase or slow down the navigation speed accordingly in a substantially instantaneous manner.

Of course, the toggle 200 may also be implemented in a manner such that it is flipped up or down rather than left or right. In that case, the up direction may correspond to a rewinding of the media program, and the down direction may correspond to a fast forwarding of the media program, or vice versa.

Figure 9:
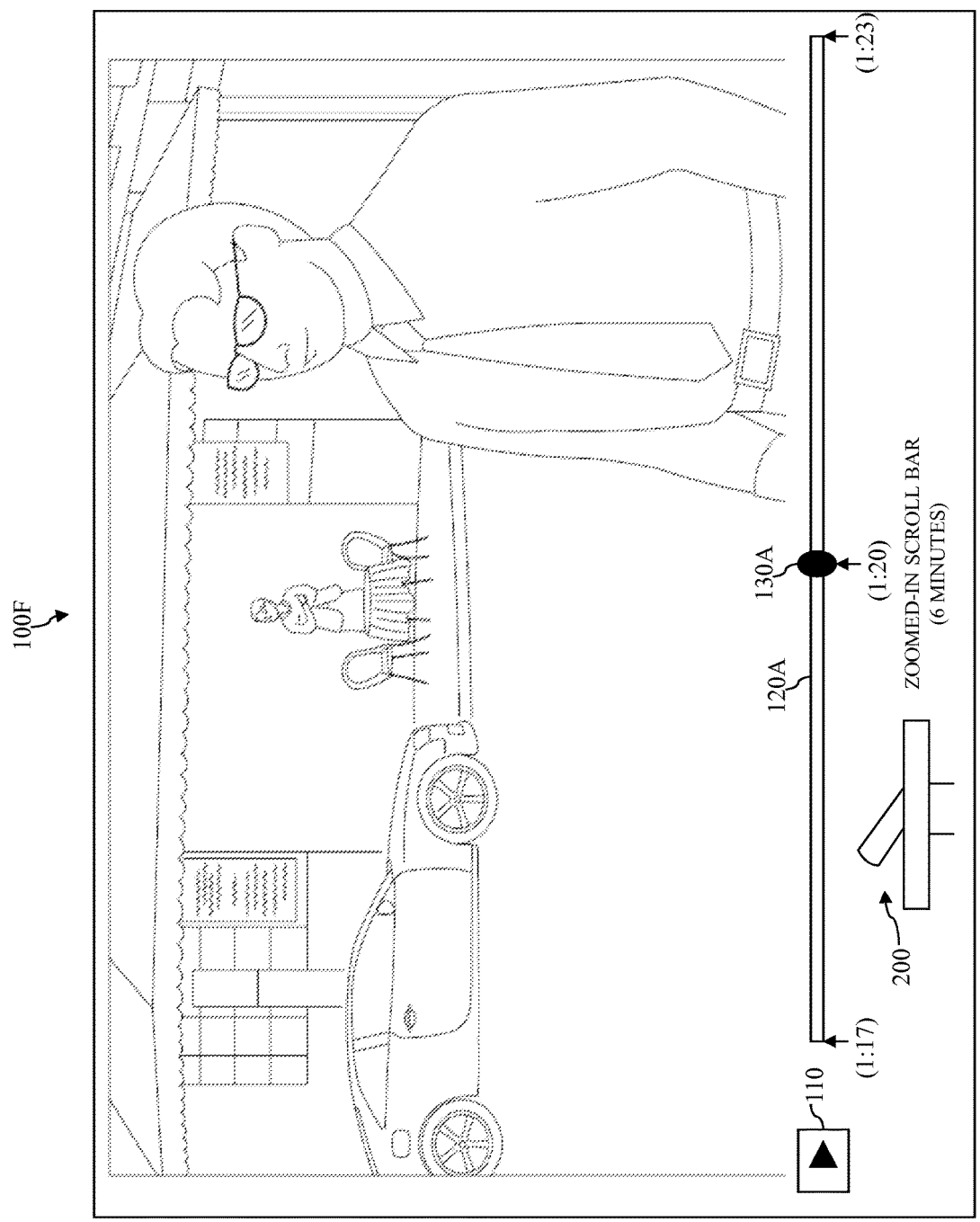

The toggle 200 can also be integrated in the embodiments discussed above where a zoomed-in scroll bar is utilized. For example, referring to FIG. 9, the toggle 200 is implemented in a user interface 100F that also includes a zoomed-in scroll bar 120A. The user may use either flip the toggle 200 to perform navigation, or move the position indicator 130A along the scroll bar 120A to perform navigation. In a similar manner, each of the embodiments of the user interfaces 100A-100D discussed above may integrate one or more instances of the toggle 200 therein. In embodiments where multiple toggles 200 are used, each toggle 200 may correspond to a different predefined speed or a predefined range of speeds.

Figure 10:
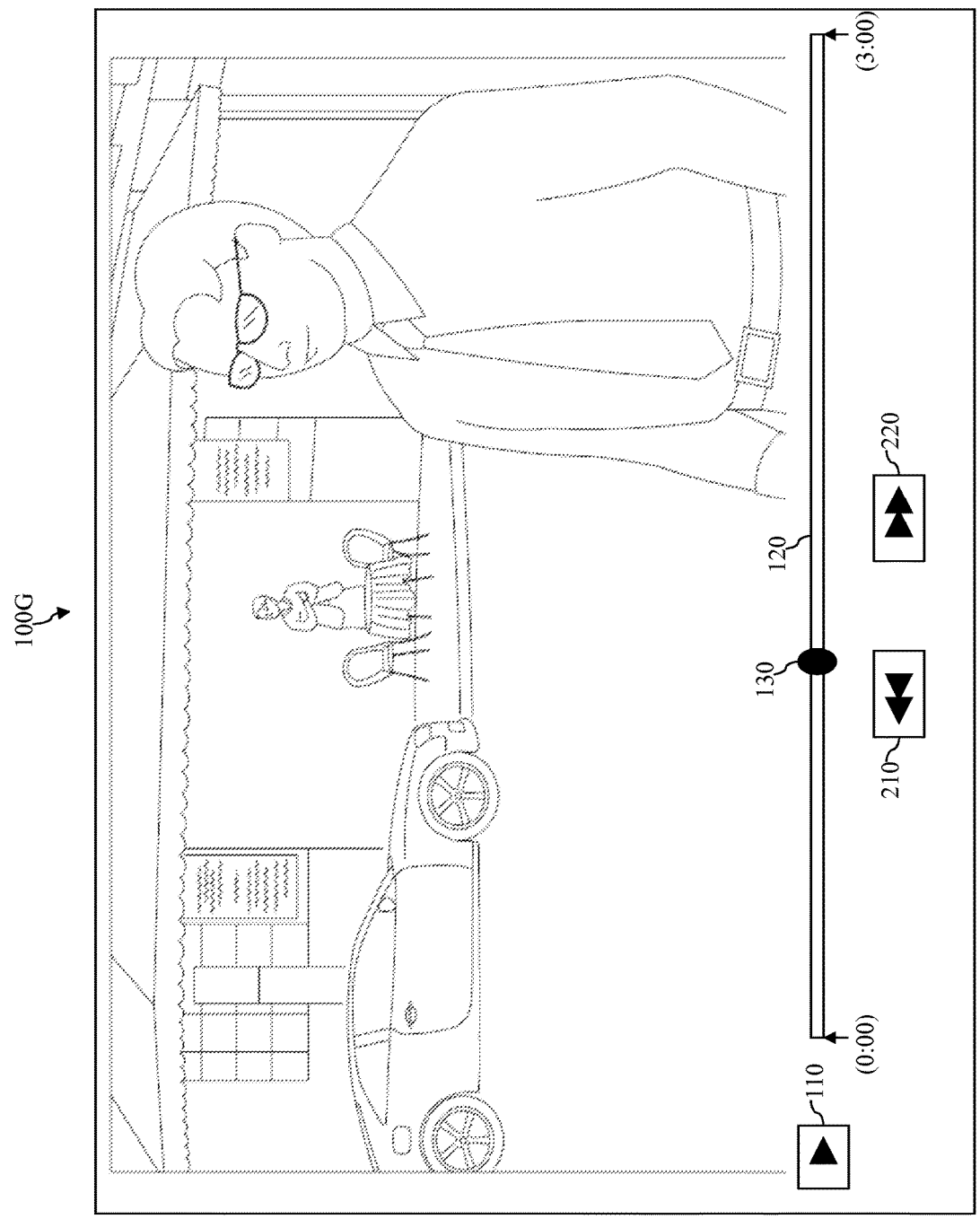

It is also understood that the toggle 200 is merely an example of a virtual on-screen control mechanism that may be used to facilitate user navigation of the media program. In alternative embodiments, other virtual on-screen control mechanisms may be used instead of, or in addition to, the toggle 200. For example, referring to FIG. 10, a user interface 100G uses a virtual rewind button 210 and a virtual fast forward button 220 to perform the rewinding and fast forwarding of the media program, respectively. In some embodiments, the speed at which the media program is rewound or fast forwarded is a function of the amount of time in which the button 210 or 220 is pressed (i.e., held down), respectively. For example, if the button 210 is tapped quickly, it results in a slow rewinding of the media program, perhaps by a few scenes. As the button 210 is held down longer, the pace at which the media program is rewound increases. The user may let go of the button 210 to stop the rewinding. The fast forwarding of the media program is done in a similar manner.

Figure 11:
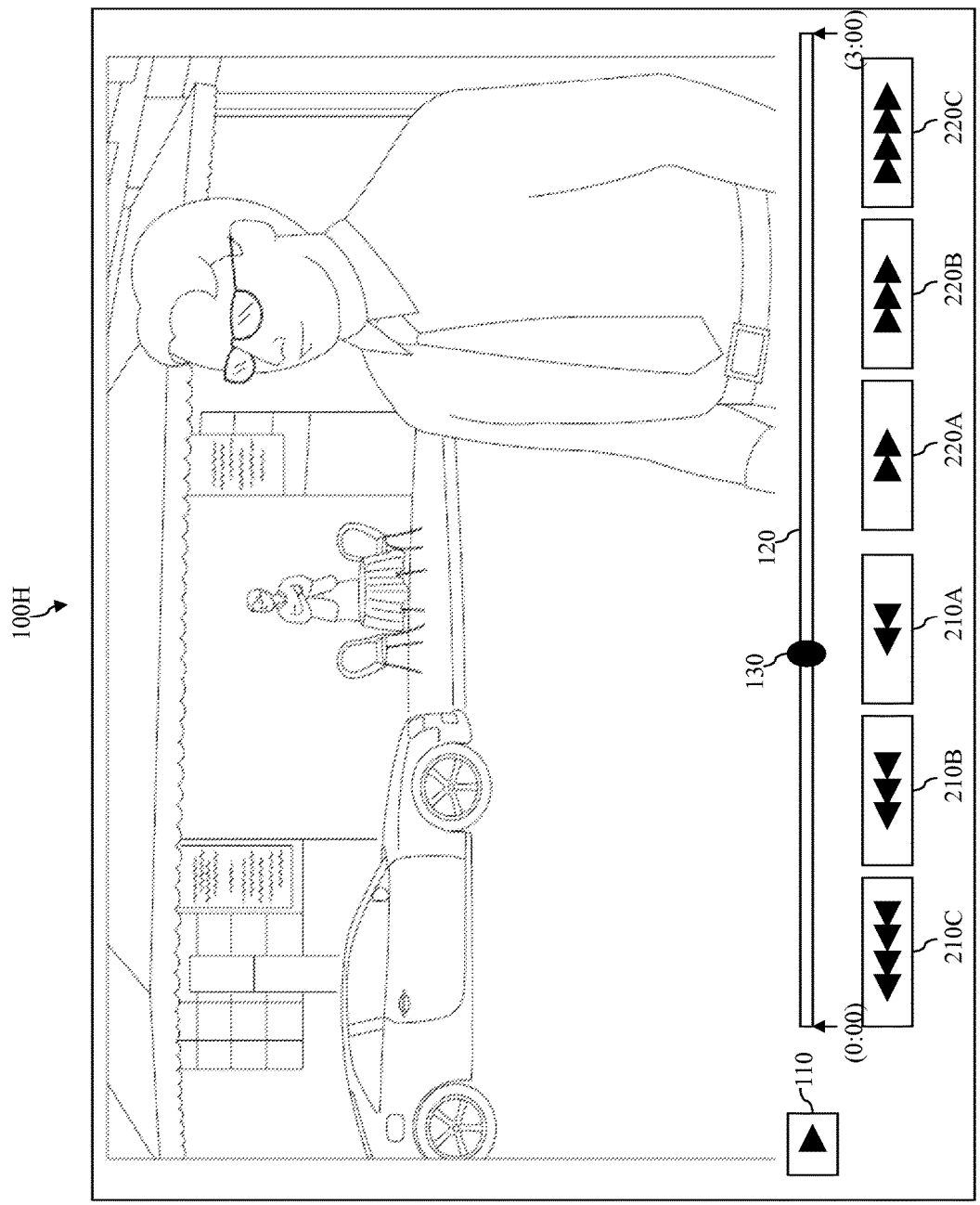

FIG. 11 illustrates another user interface 100H according to yet another embodiment. In the user interface 100H, a plurality of virtual rewind buttons 210A/B/C and a plurality of virtual fast forward buttons 220A/B/C are used to perform navigation through the media program. Each virtual rewind button 210A/B/C is associated with a different rewind speed, and each fast forward button 220A/B/C is associated with a different fast forward speed. For example, the rewind button 210A may be pressed to start rewinding of the media program at a first speed, the rewind button 210B may be pressed to start rewinding of the media program at a second speed greater than the first speed, and the rewind button 210C may be pressed to start rewinding of the media program at a third speed greater than the first and second speeds.

Similarly, the fast forward button 220A may be pressed to start fast forwarding of the media program at a first speed, the fast forward button 220B may be pressed to start fast forwarding of the media program at a second speed greater than the first speed, and the fast forward button 220C may be pressed to start fast forwarding of the media program at a third speed greater than the first and second speeds. Although three rewind buttons 210A/B/C and three fast forward buttons 220A/B/C are used in the example illustrated in FIG. 11, any other number of rewind or fast forward buttons may be used in alternative embodiments.

Figure 12:
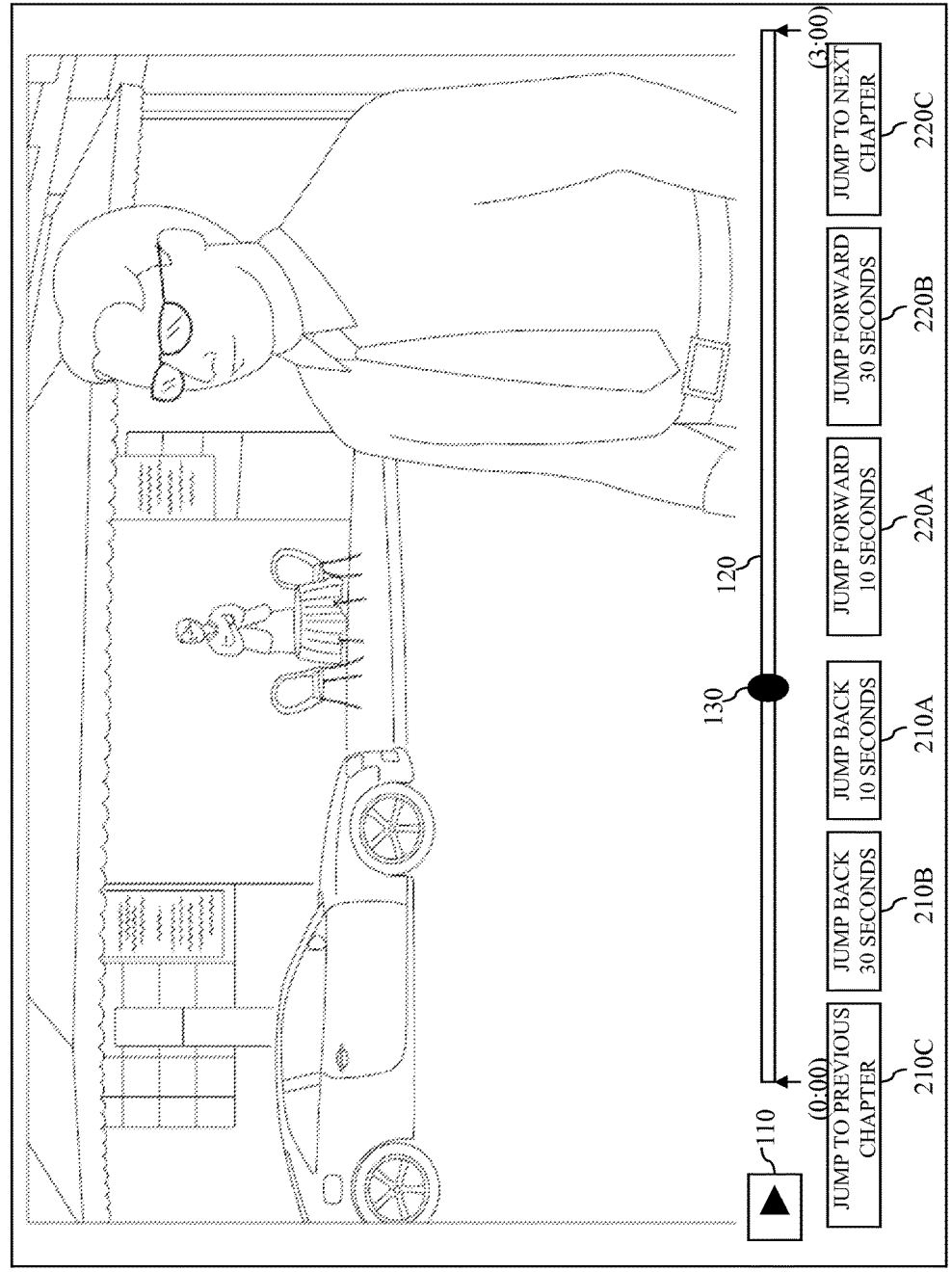

FIG. 12 illustrates yet another user interface 100I according to yet another embodiment. In the user interface 100H, a plurality of virtual on-screen control mechanisms are illustrated as a "jump back 10 seconds" button 210A, a "jump back 30 seconds" button 210B, and a "jump to previous chapter" button 210C, a "jump forward 10 seconds" button 220A, a "jump forward 30 seconds" button 220B, and a "jump to next chapter" button 220C. As the names of these buttons imply, a click of the "jump back 10 seconds" button 210A rewinds the media program by 10 seconds, a click of the "jump back 30 seconds" button 210B rewinds the media program by 30 seconds, and a click of the "jump to previous chapter" button 210C rewinds the media program to the start of a previous chapter (for example, if the media program contains a plurality of chapters), a click of the "jump forward 10 seconds" button 220A fast forwards the media program by 10 seconds, a click of the "jump forward 30 seconds" button 220B fast forward the media program by 30 seconds, and a click of the "jump to next chapter" button 220C fast forwards the media program to the start of a subsequent chapter. Meanwhile, the scroll bar 120 (and the indicator 130) may still be used in conjunction with these on-screen control mechanisms 210A-C and 220A-C to perform navigational tasks.

Although not specifically illustrated, other embodiments of the user interface 100I may employ additional virtual on-screen control mechanisms to further facilitate the navigation through the media program. As an example, a user input mechanism such as a text field may be used, where a user may input numbers indicating the desired time location of the media program that he wishes to see. For instance, the user may input "1:20:25" to indicating that he wishes to jump directly to the scene of the media program at the time location of 1 hour 20 minutes and 25 seconds. In addition to text input fields, virtual mechanisms such as spin-able wheels may also be used to select the desired numbers for the target time location. Other suitable virtual mechanisms may also be used to accomplish this task as well.

Figure 13:
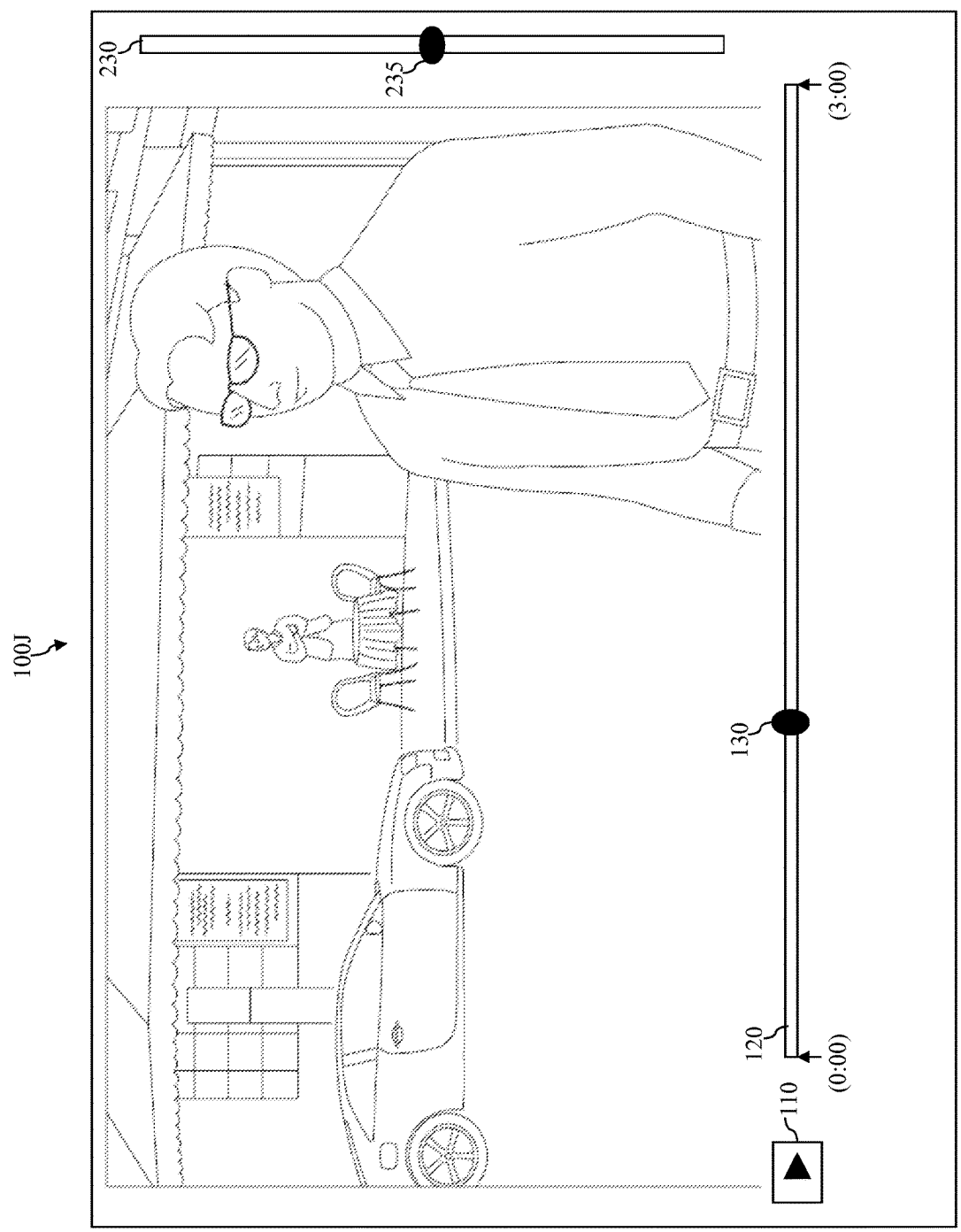

For example, referring now to FIG. 13, a user interface 100J may employ a horizontally oriented scroll bar 120 as its "main" scroll bar. In other words, the scroll bar 120 corresponds to the total length of the media program, and the time scale associated with the scroll bar 120 is neither zoomed-in nor zoomed-out. In addition to the "main" scroll bar 120, the user interface 100J may also display a vertically oriented zoomed-in scroll bar 230 (i.e., with a magnified time scale), along which a position indicator 235 can be moved to finely navigate the media program (i.e., in a magnified time scale). In that regard, the zoomed-in scroll bar 230 has a vertical length that corresponds to a fraction of the total length of time of the media program. For example, the vertical length of the zoomed-in scroll bar 230 may be correspond to just a few minutes of time or any other amount of time that is a fraction of the total duration of the media program.

The displaying of the zoomed-in scroll bar 230 may be triggered by a variety of ways, such as by the user clicking on a button (e.g., shown in FIG. 1 or 3), or by the speed at which the user moves the position indicator 130 along the scroll bar 120, etc. In some embodiments, the zoomed-in scroll bar 230 and the position indicator 235 need not necessarily appear visible, in which case an area of contact between the screen (on which the user interface 100J is displayed) and the user's finger or the stylus may effectively serve as a position indicator. The user may move his finger or the stylus anywhere vertically on the screen, and the zoomed-in scrolling (in the magnified time scale) discussed above may be performed accordingly.

Figure 14:
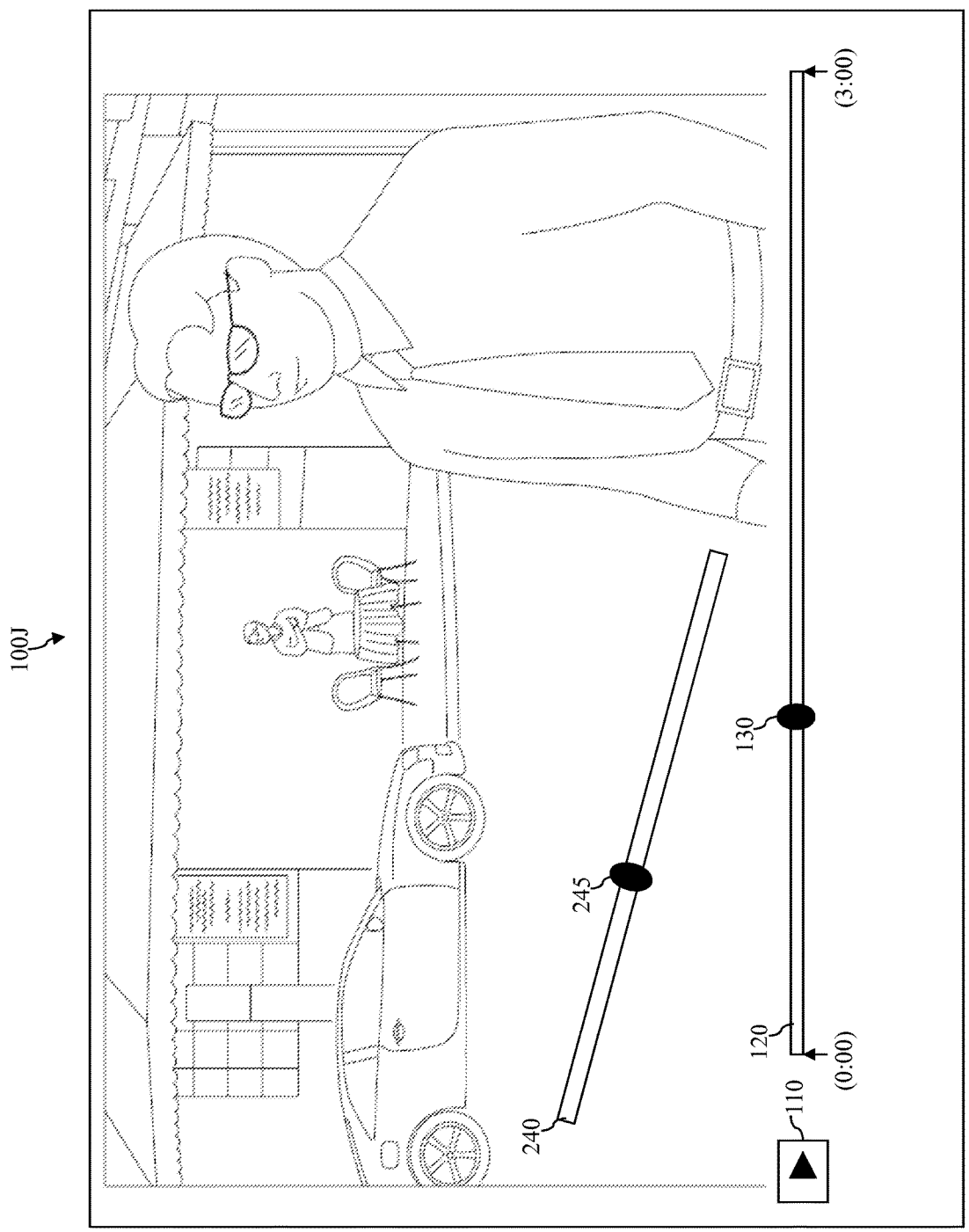

It is also understood that while a vertical scroll bar 230 is illustrated herein as an example, a zoomed-in scroll bar may also be implemented that does not have a vertical or a horizontal orientation. For example, referring to FIG. 14, a slanted zoomed-in scroll bar 240 may be implemented in certain embodiments. A position indicator 245 may be moved along the slanted zoomed-in scroll bar 240 to finely navigate through the media program. As is in the case of the vertical scroll bar 230 in FIG. 13, the slanted zoomed-in scroll bar 240 in FIG. 14 may or may not appear visible in various embodiments. In addition, in some embodiments, the degree of tilt or the slant angle of the scroll bar 240 may determine its associated time scale. For example, the more tilted the scroll bar 240 is, the finer (i.e., more magnified) its associated time scale may be, or vice versa.

Figure 15:
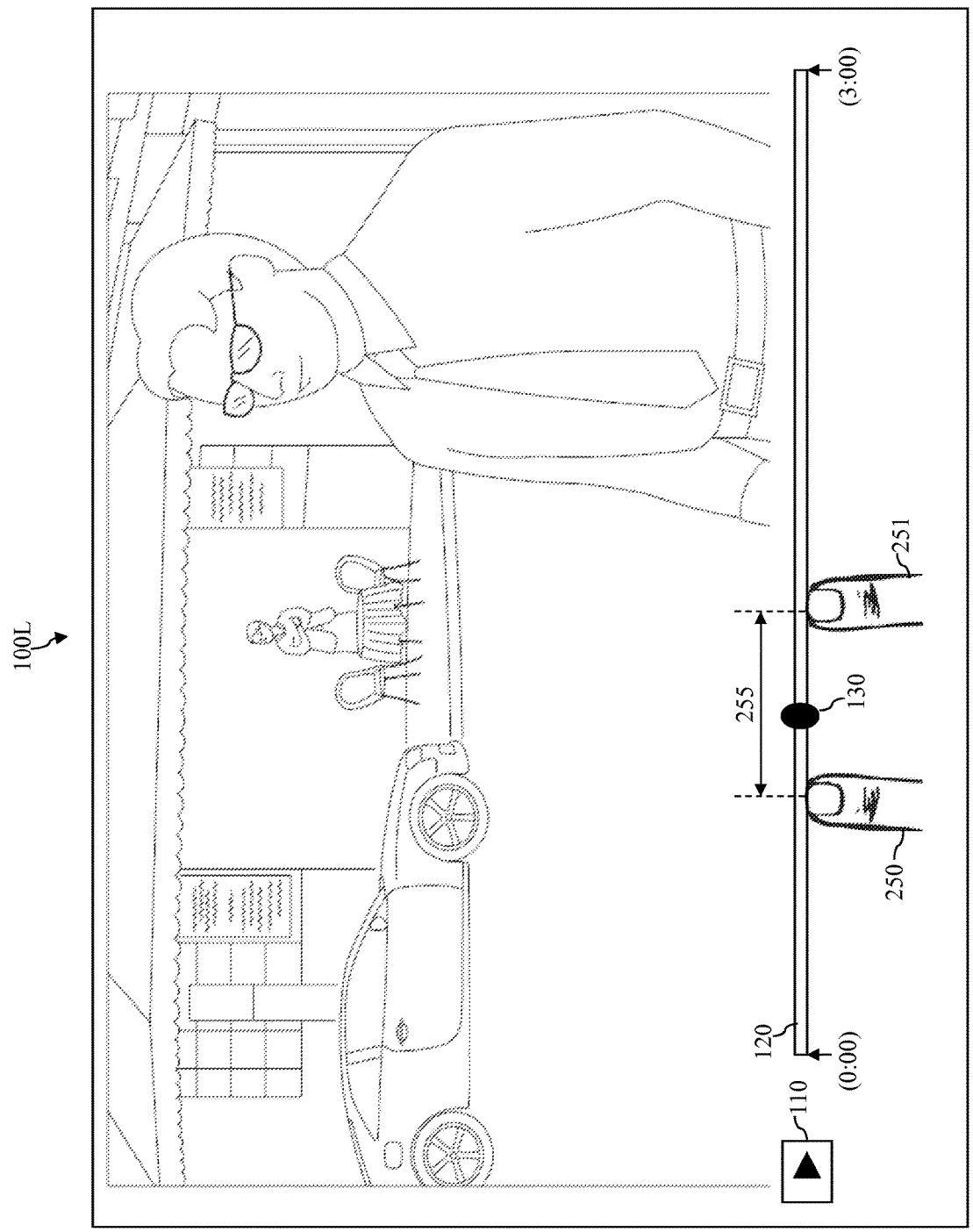

The present disclosure also allows a zoomed-in scroll bar to be triggered or launched by a multi-touch user input. For example, referring now to FIG. 15, as the media program is being displayed in a user interface 100L, the user may engage the screen (e.g., a touch-sensitive screen on which the media program is displayed) with two of his/her fingers 250-251. In some embodiments, the engagement of the two fingers 250-251 may occur substantially simultaneously. For example, the user may simultaneously tap on two different points of the scroll bar 120, one with the finger 250, and the other with the finger 251. Alternatively, the user may touch a respective area outside the scroll bar 120 (e.g., a portion of the screen underneath or above the scroll bar 120) with each of the fingers 250-251, and subsequently slide the fingers 250-251 onto the scroll bar 120. In some embodiments, the sliding of the fingers 250-251 may occur substantially simultaneously.

In the illustrated embodiment, the engagement of the two fingers 250-251 with the scroll bar 120 defines a segment 255 of the scroll bar 120. In the illustrated embodiment, the position indicator 130 is disposed within the segment 255. In other embodiments, the position indicator 130 may be disposed outside the segment 255.

Figure 16:
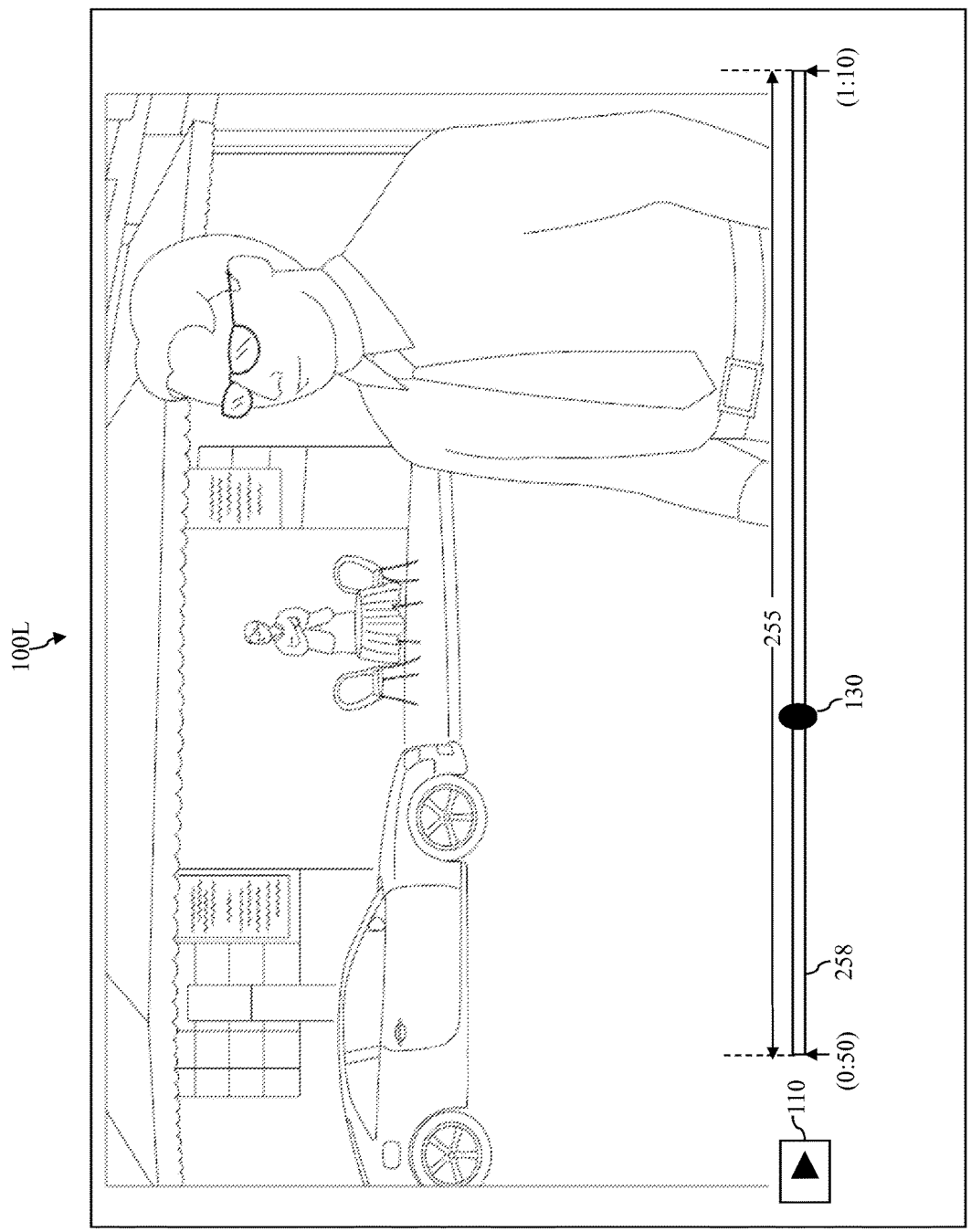

Referring now to FIG. 16, a zoomed-in scroll bar 258 may be launched in the user interface 100L based on the segment 255. For example, if the segment 255 corresponds to 20 minutes of the media program from 0:50:00 to 1:10:00, then the length of the zoomed-in scroll bar 258 represent 20 minutes of the media program, where a beginning of the zoomed-in scroll bar 258 corresponds to a point in time of the media program at 0:50:00, and an end of the zoomed-in scroll bar 258 corresponds to a point in time of the media program at 1:10:00. The user may then move the position indicator 130 along the zoomed-in scroll bar 258 to navigate through the media program in the magnified time scale.

The triggering of the zoomed-in scroll bar 258 via the multi-touch user engagement is beneficial because it lets the user intuitively determine or "see" how much to zoom in. In other words, the user can set the magnified time scale by deciding how far apart the two fingers 250-251 are when they engage the scroll bar 120. The farther apart the fingers 250-251 are from one another (i.e., the longer the segment 255 in FIG. 15), the less the time magnification, meaning that the scroll bar 258 is not zoomed in as much and represents a longer time duration. Conversely, the closer the fingers 250-251 are from one another (i.e., the shorter the segment 255 in FIG. 15), the greater the time magnification, meaning that the scroll bar 258 is more zoomed in and represents a shorter time duration. In some embodiments, an amount of time magnification of the scroll bar 258 with respect to the scroll bar 120 is equal to a length of the scroll bar 120 in FIG. 15 divided by a length of the segment 255 in FIG. 15. For example, if the length of the segment 255 is one-tenth of the length of the scroll bar 120, then the amount of time magnification associated with the scroll bar 258 is ten times of the time scale associated with the scroll bar 120.

It is also understood that, according to the various aspects of the present disclosure, a separate and distinct zoomed-in scroll bar is not required to achieve the zoomed-in scrolling (i.e., navigating through the media program in a magnified or finer time scale) discussed above. For example, referring now to FIG. 17, a user interface 100K may allow the user to engage a portion of the screen (e.g., a touch-sensitive screen on which the user interface 100K is displayed) outside the regular scroll bar 120 via a gesture 260. The performance of the gesture 260 triggers a zoomed-in scrolling mode (i.e., with a magnified time scale). The amount of magnification may be preset by the provider of the user interface 100K, or may be configured by the user.

The movement of the user's finger or stylus in generating the gesture 260, per unit length, allows the media program to be navigated forward or backward in time more slowly than the same unit length of movement of the position indicator 130 along the regular scroll bar 120. As an example, suppose a centimeter of movement of the position indicator 130 along the scroll bar 120 causes the media program to be moved forward (or backward) in time by 20 minutes, the same centimeter of movement of the gesture 260 may only cause the media program to be moved forward (or backward) in time by a minute or just a few minutes, instead of 20 minutes.

In the embodiment shown, the gesture 260 is a wrap-around gesture that includes a trace to the right and then returns to the left. Thus, the wrap-around gesture contains at least two directional components that are opposite from each other directionally. The initial directional component of the gesture 260 determines whether the media program should be fast forwarded (i.e., navigated forward in time) or rewound (i.e., navigated backward in time) in the magnified time scale. For example, if the initial direction of the gesture 260 points to the right (as is the case shown in FIG. 17), the media program will be fast forwarded in the magnified time scale. On the other hand, if the initial direction of the gesture 260 points to the left, the media program will be rewound in the magnified time scale.

Furthermore, as long as the gesture is continuous (e.g., the user's finger or stylus never leaves the screen), the fast forwarding or the rewinding of the media program will continue in the magnified time scale. For example, in the embodiment shown in FIG. 17, the gesture 260's initial directional component points to the right, and thus the media program will be navigated forward in time (in the magnified time scale). As the gesture 260 wraps around to the left, the forward navigation of the media program will still continue, since the gesture 260 remains continuous as it is being wrapped around. In fact, although not specifically illustrated herein for reasons of simplicity, the gesture 260 may wrap around any number of times (e.g., similar to a spiral), and as long as it remains continuous, the forward or backward navigation of the media program (dictated by the initial directional component of the gesture 260) will continue in the magnified time scale. Therefore, it is theoretically possible that the user may navigate through the entire media program in the magnified time scale by engaging the screen with a continuous gesture 260 (e.g., drawing a number of loops/circles/spirals as long as the finger or stylus never leaves the screen).

As another example of providing navigation through the media program without using a distinct scroll bar, the user may also perform a sliding gesture 261 through the user interface 100K. In more detail, the sliding gesture 261 is performed when the user slides his/her finger or stylus across the touch-sensitive screen on which the user interface 100K is displayed. The sliding gesture 261 includes one or more segments that are non-parallel to the scroll bar 120, that is, these segments are each at an angle with respect to the scroll bar 120. In the illustrated embodiment, the sliding gesture 261 includes a segment 261A and a segment 261B. The segment 261A is at a first angle with respect to the scroll bar 120, and the segment 261B is at a second angle with respect to the scroll bar 120. The second angle is greater than the first angle in this example (since the segment 261B is more tilted than the segment 261A), but the reverse may be true in other embodiments.

As the sliding gesture 261 is performed, the media program is navigated forward (or backward) in time in a magnified time scale. The respective angle (or amount of tilt) of each segment 261A/B determines the amount of time magnification. In some embodiments, the greater the angle (i.e., the more tilted the segment), the greater the time magnification. For example, in the example embodiment shown in FIG. 17, as the segment 261A of the sliding gesture is being performed, the media program may be navigated forward in time in a ×5 magnified time scale compared to the time scale associated with the scroll bar 120. In other words, the media program is navigated by the same amount in time by a unit length of the segment 261A, or by a ⅕ unit length of the movement of the position indicator 130 along the scroll bar 120. However, as the segment 261B of the sliding gesture is being performed, the media program may be navigated forward in time in a ×10 magnified time scale compared to the time scale associated with the scroll bar 120. In other words, the media program is navigated by the same amount in time by a unit length of the segment 261B, or by a ⅒ unit length of the movement of the position indicator 130 along the scroll bar 120.

In this manner, the user may dynamically control the amount of time magnification by adjusting the degree of tilt (i.e., the angle) of the various segments of the sliding gesture 261 while it is being carried out. For example, the user may begin to navigate the media program in the magnified time scale with the segment 261A of the sliding gesture. But as this is being performed, the user may realize that the media program is still being navigated too fast, or in other words, the amount of time scale magnification is still insufficient. As such, the user may switch to the segment 261B, which further increases the time magnification while the media program is being navigated, thereby allowing the user to more precisely pinpoint or locate the scene of interest.

Figure 17:
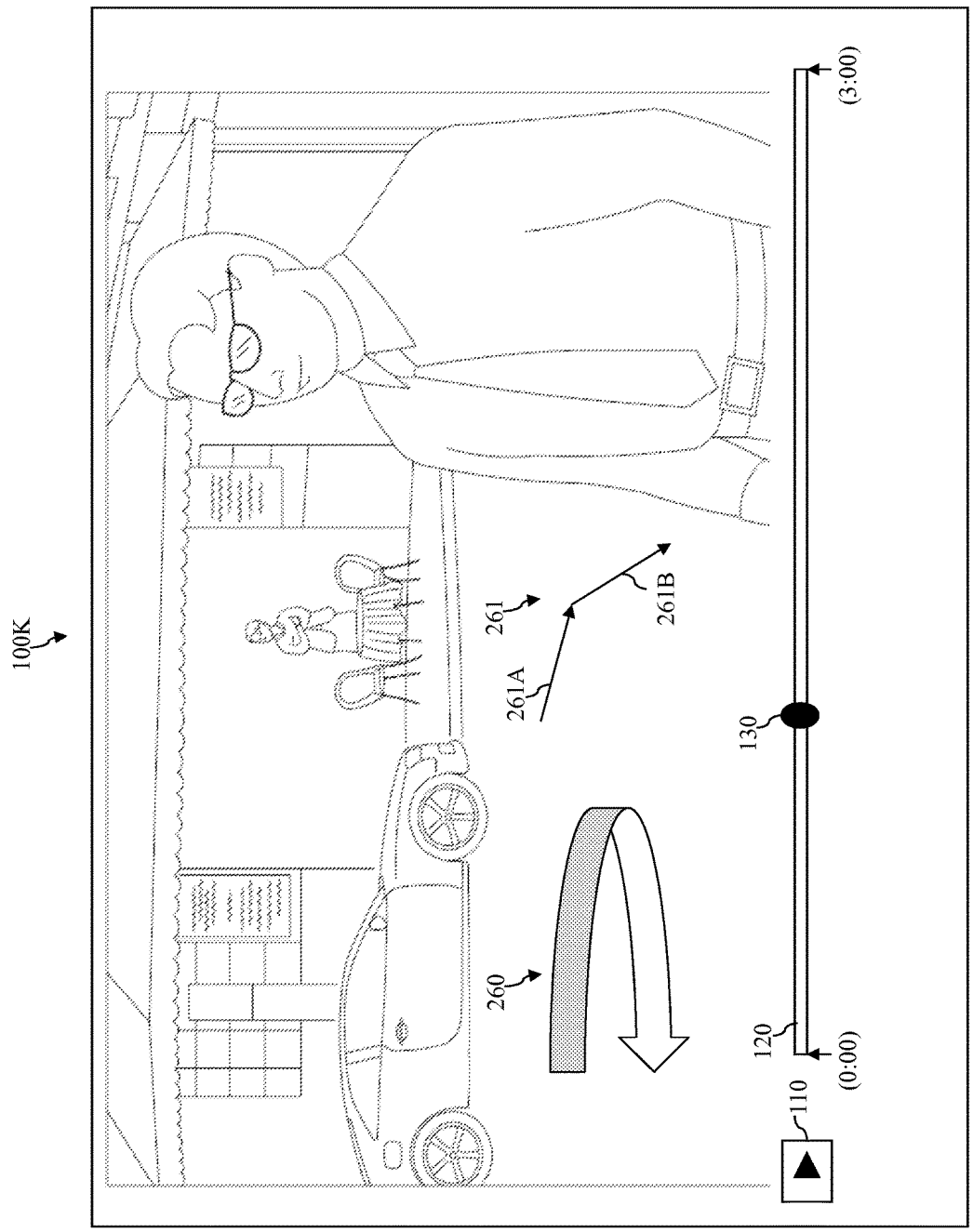

It is understood that the gestures 260-261 do not require the screen (on which the user interface 100K is displayed) to be actually touched. In some embodiments, the user may hover the finger or stylus above the touch-sensitive screen to perform the gestures 260-261 as well. It is also understood that although the scroll bar 120 is illustrated in FIG. 17 to facilitate the above discussions, it may actually be hidden while the gestures 260 or 261 is performed.

In accordance with various aspects of the present disclosure, the user interface discussed herein also allows a user to quickly navigate to a number of predetermined locations on the scroll bar 120. For example, referring now to FIG. 18, a user interface 100M displays a scroll bar 120 that has a plurality of predefined locations 270-284 embedded therein. These predefined locations 270-284 appear visible in FIG. 18 to provide a visual illustration of the discussions below. However, it is understood that the predefined locations predefined locations 270-284 may be visible to a user in some embodiments, but they may also be invisible in other embodiments. In addition, it is understood that the number of the predefined locations 270-284 is not a set number and may vary from embodiment to embodiment.

The predefined locations 270-284 are each associated with (or correspond to) a different point in time of the media program that is displayed. In some embodiments, the predefined locations 270-284 are substantially evenly spaced apart from one another. For example, each predefined location may be separated from an adjacent predefined location by about X number of minutes. The user may be allowed to configure or specify the spacing between adjacent predefined locations, for example through a window or menu not illustrated herein for reasons of simplicity. In some embodiments, the user may specify the number of the predefined locations, rather than the spacing between the predefined locations. In addition, in certain embodiments, the user configuration of the spacing or the number of the predefined locations may be performed for each media program on an individual basis. Alternatively, the spacing or the number of the predefined locations may be determined by the media program provider, or by the provider for the user interface 100M.

In other embodiments, the predefined locations 270-284 may not be evenly distributed throughout the scroll bar 120, but rather their positions may be either predefined by the provider of the media program, or by the user. For example, in some embodiments, the provider of the media program may set the predefined locations 270-284 to each correspond with the beginning of a new "scene" or a new "chapter" in a media program. Since the "scenes" or "chapters" within a media program may vary in length, the spacings or distances among the predefined locations 270-284 may vary as well.

In some other embodiments, one or more of the predefined locations 270-284 may each correspond to a user-defined favorite scene or excerpt, as described in U.S. patent application Ser. No. 13/610,301, filed on Sep. 11, 2012, entitled "Method and Apparatus For Creating User-Defined Media Program Excerpts", the disclosure of which is hereby incorporated by reference in its entirety. In other words, a user may be allowed to predefine a number of excerpts in a media program, and these excerpts may begin at any time within a scene or chapter of a media program. Once the user has predefined these excerpts, he/she may choose to configure a subset (or all) of the predefined locations 270-284 to correspond with the beginnings of these user-defined excerpts as well.

Figure 18:
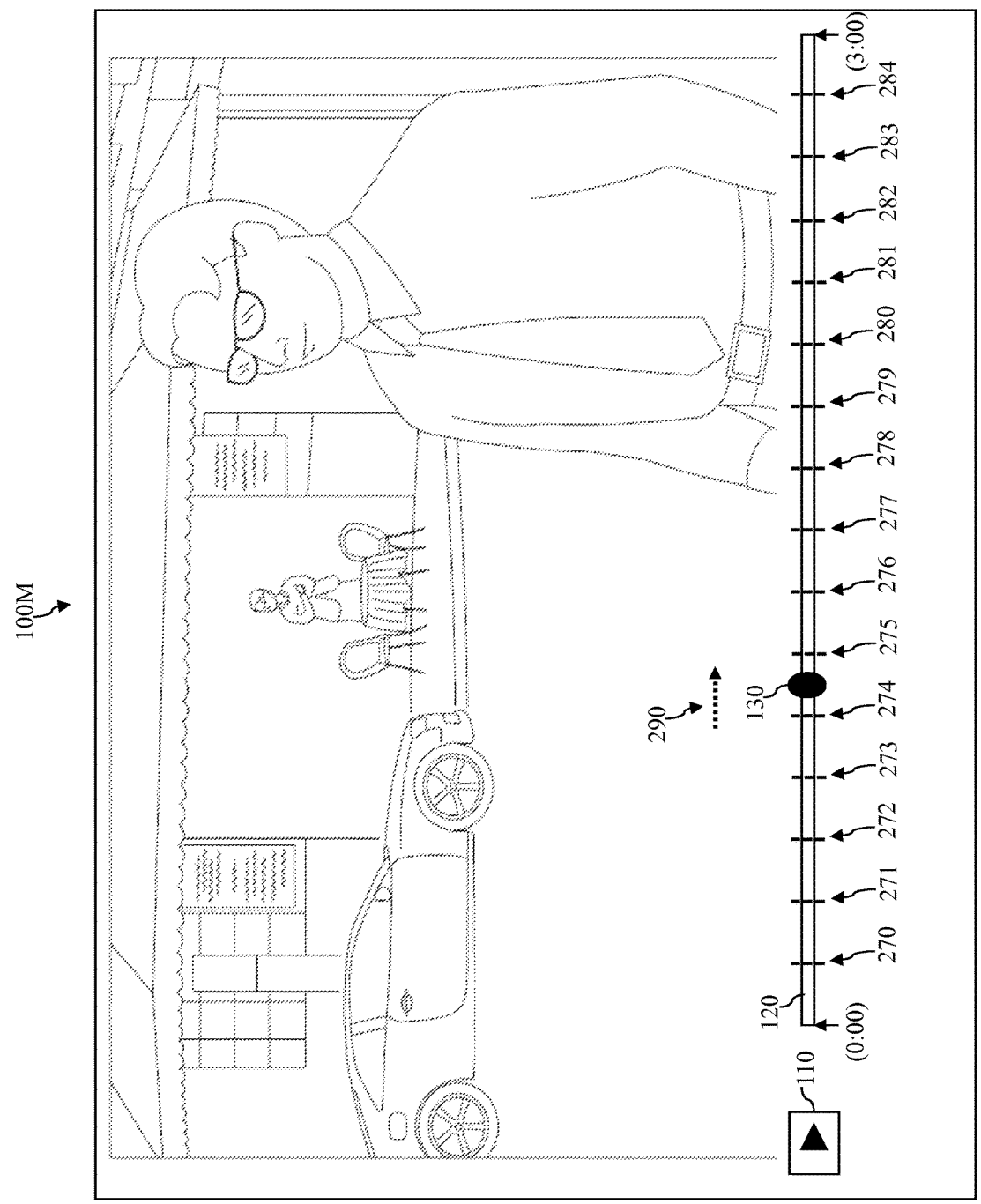
Figure 19:
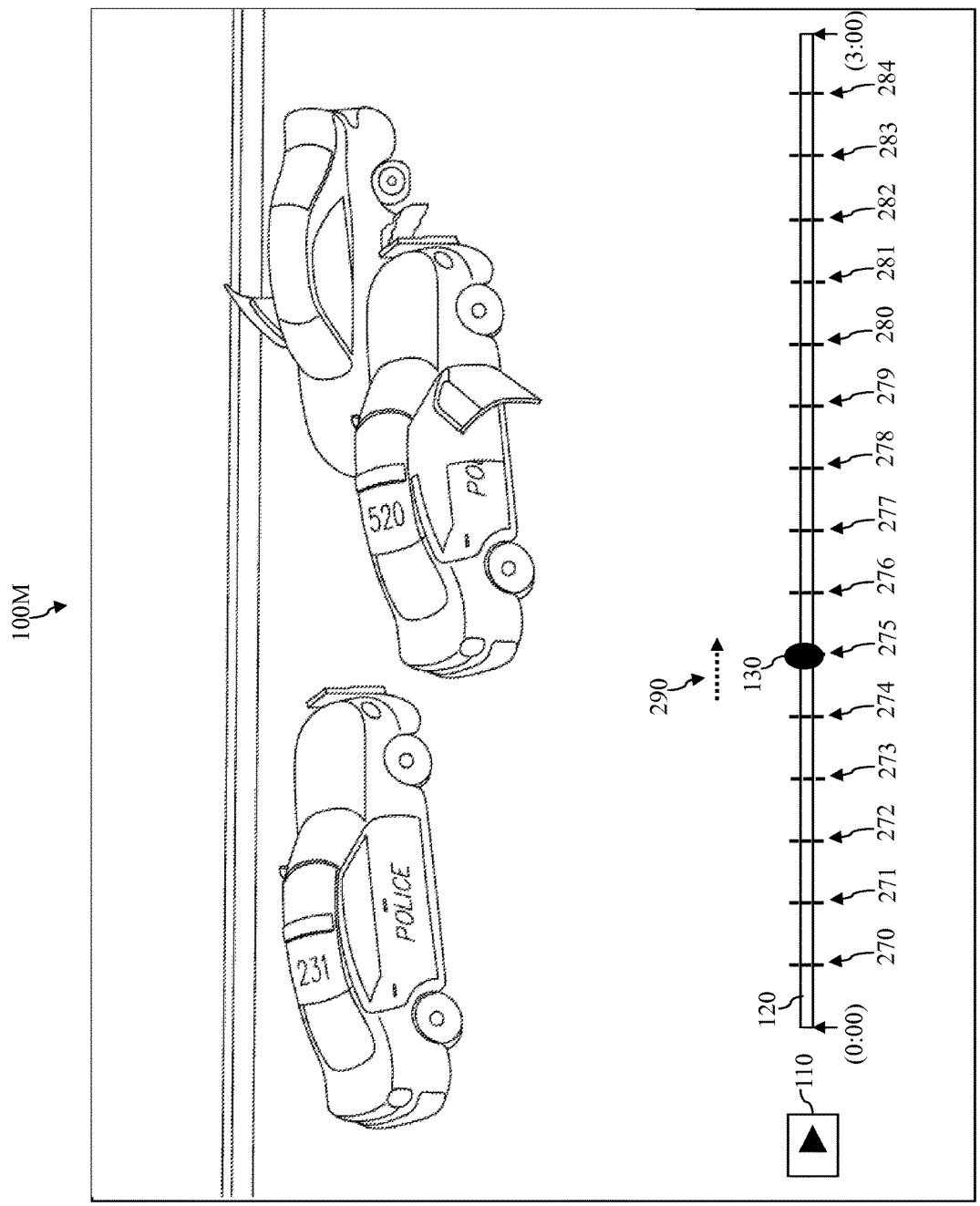

The existence of the predefined locations 270-284 allows the user to quickly and intuitively navigate through the media program. For example, according to various aspects of the present disclosure, as the user drags the position indicator 130 along the scroll bar 120, the position indicator may be "snapped" to one or more of the predefined locations 270-284. An example of this is illustrated in FIGS. 18-19. As shown in FIG. 18, the position indicator 130 is located between the predefined locations 274 and 275, meaning that the media program is being played at a time after the time corresponding with the predefined location 274, but before the time corresponding with the predefined location 275.

Now suppose the user drags the position indicator 130 to the right, which is conceptually indicated by a dashed arrow 290 pointing to the right. As the position indicator 130 moves along the scroll bar 120, it may be "snapped" to the nearest predefined location, which is the predefined location 275, as shown in FIG. 19, which may display a different scene than what was shown in FIG. 18. In some embodiments, the "snapping" of the position indicator 130 to the nearest predefined location may include a sudden or sharp movement of the position indicator 130 before it lands on the nearest predefined location (in this case, the predefined location 275). For example, the position indicator 130 may be typically moved at a first speed (dictated by the user's movement of a finger or a stylus) along the scroll bar 120. As the position indicator 130 moves close (e.g., within a predefined distance or proximity) to the nearest predefined location, however, the movement of the position indicator 130 may speed up to a second speed that is faster than the first speed, until the position indicator 130 lands on the nearest predefined location.

At this point, the movement of the position indicator 130 may temporarily pause (e.g., a pause ranging from a few tens of milliseconds to about a few seconds), which may allow the scene corresponding to this predefined location to be displayed in some embodiments. Although, if the media program is being streamed through a somewhat slow Internet connection that would otherwise require a long buffer time for the new scene to be displayed, the mere snapping of the position indicator to the nearest predefined location may not necessarily result in the new scene to be automatically displayed. As such, the automatic displaying of the new scene may be disabled when slow interconnection connections are detected. The displaying of the new scene may be disabled until the user stops the moving of the position indicator 130 for a sufficiently long period of time to indicate that he/she wishes the media program to start playing at this new location.

In any case, if the user continues to move the position indicator 130 along the scroll bar 120, the temporary pausing of the position indicator 130 at the predefined location 275 will stop. The position indicator 130 will continue to be moved along the scroll bar until it is again snapped to the next predefined location 276.

It is understood that the discussions above merely describe some example embodiments of the snapping of the position indicator to the nearest predefined location according to the various aspects of the present disclosure. The snapping may be implemented differently in alternative embodiments. For example, the position indicator 130 may not necessarily speed up as it approaches the nearest indicator (e.g., exhibiting no sudden or sharp movement). Instead, there may just be a temporary pause once the position indicator 130 has been snapped to the predefined location. Instead of (or in addition to) the temporary pause, the user interface 100M may also communicate to the user that the snapping has occurred, for example by playing an audible alert or sending the user a haptic or some other type of tactile feedback.

The snapping of the position indicator 130 to a nearest predefined location is beneficial, because it allows the user to quickly and intuitively navigate to various points of interest in the media program. For example, in embodiments where the predefined locations 270-284 correspond to the starting points of different scenes or chapters—whether these scenes or chapters are predefined by the media program provider or by the user or other users—the user will immediately recognize that he/she has reached the beginning of the next scene or chapter by the snapping of the position indicator 130 to one of the predefined locations 270-284.

In addition, if the user wishes to jump to not just the next (i.e., the most immediate) scene or chapter, but several ones after that, the snapping of the position indicator 130 to the predefined locations 270-284 while being dragged along the scroll bar 120 is also helpful, because it reminds the user (or allows the user to keep track of) how many scenes or chapters are being skipped. For example, suppose that the user wishes to navigate five scenes forward in time from the scene shown in FIG. 19 (i.e., the scene that corresponds to the predefined location 275). In other words, the user wishes to jump to the scene that corresponds to the predefined location 280. One way of doing this is to hit the "jump to next chapter" fast forward button 220C shown in FIG. 12 five times. But another way is for the user to simply drag the position indicator 130 along the scroll bar 120, and the user can monitor how many times the snapping of the position indicator 130 occurs. On the fifth occurrence of the position indicator 130, the user will recognize that he/she has successfully navigated five scene/chapters forward in the media program.

Even in embodiments where the predefined locations 270-284 do not correspond to the beginnings of scenes or chapters within the media program, the snapping of the position indicator 130 to the predefined locations 270-284 may still be useful. For example, suppose that the user had previously specified that the spacing between adjacent predefined locations is 10 minutes. In other words, each of the predefined locations 270-284 is separated from the nearest one of the predefined locations 270-284 by 10 minutes. In that example, as the user drags the position indicator 130 along the scroll bar 120, the user may intuitively recognize that he/she has fast forwarded (or navigated forward in time) or rewound (or navigated backward in time) by 10 minutes each time the position indicator 130 has been snapped to one of the predefined locations 270-284. This helps the user navigate through the media program in a more informed manner.

Figure 20:
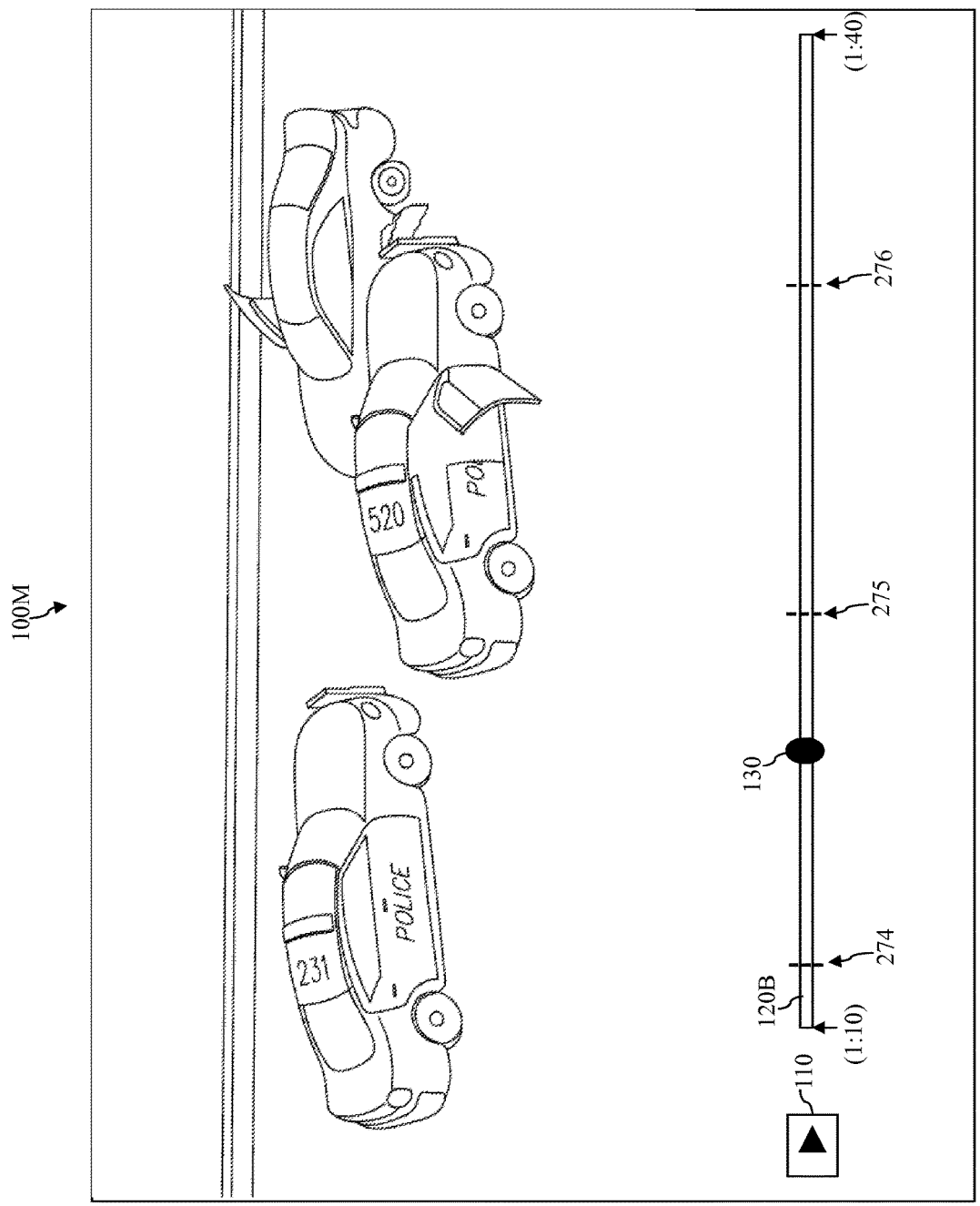

It is also understood that the snapping process discussed above may be performed while the zoomed-in scroll bar (i.e., a scroll bar corresponding to a magnified time scale) is triggered or displayed. For example, referring to FIG. 20, suppose that a zoomed-in scroll bar 120B has been activated and displayed in the user interface 100M, where the zoomed-in scroll bar 120B corresponds to a time period of 30 minutes. In this example, also suppose that the predefined locations 274-276 fall into (or are embedded within) the zoomed-in scroll bar 120B. As such, the user may still drag the position indicator 130 along the zoomed-in scroll bar 120B, and the position indicator 130 will be snapped to the predefined locations 274-276 as it approaches these predefined locations.

Figure 21:
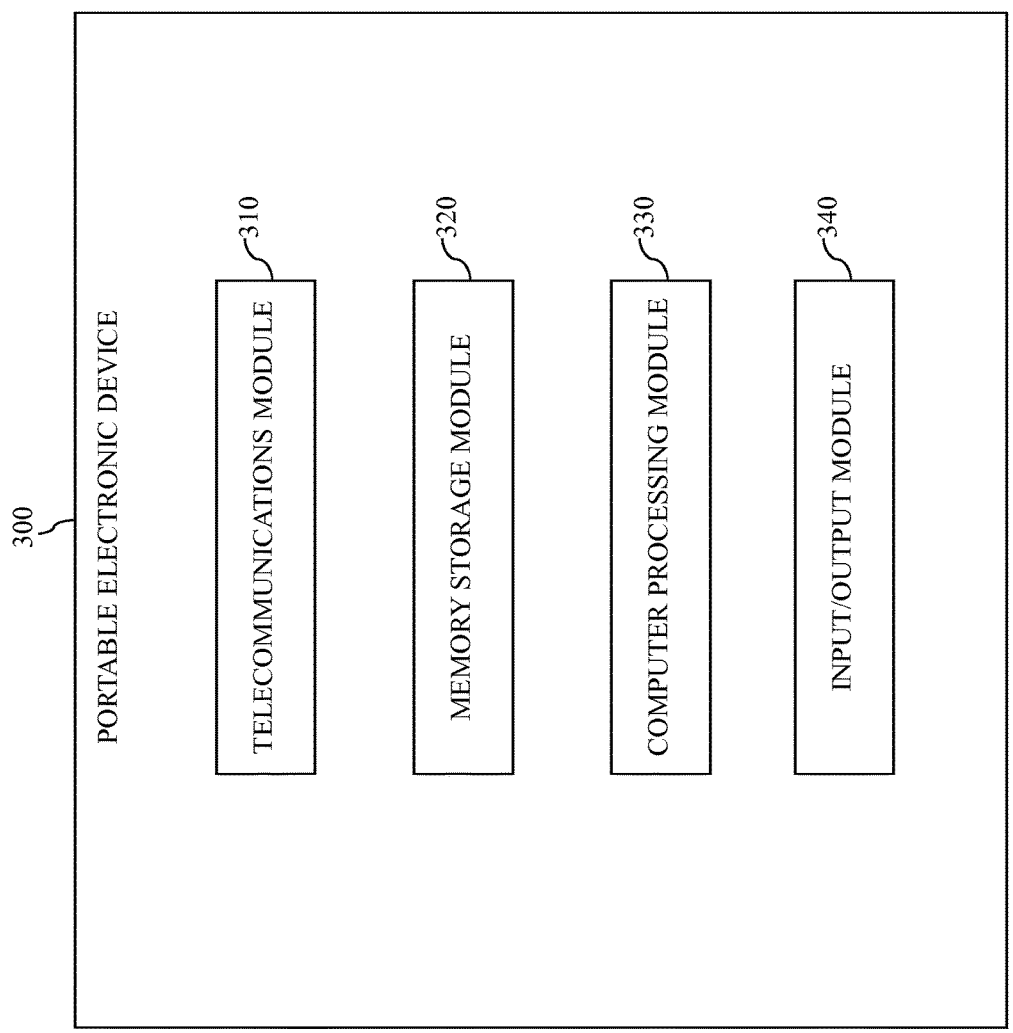
FIG. 21 is a block diagram of an example portable electronic device for displaying and navigating through the media program according to various aspects of the present disclosure.

FIG. 21 is a simplified block diagram of an embodiment of a portable electronic device 300 according to the various aspects of the present disclosure. The portable electronic device 300 includes a telecommunications module 310. The telecommunications module 310 contains various electronic circuitry components configured to conduct telecommunications with one or more external devices. The electronic circuitry components allow the telecommunications module 310 to conduct telecommunications in one or more of the wired or wireless telecommunications protocols, including communications protocols such as IEEE 802.11 (WiFi), IEEE 802.15 (Bluetooth), GSM, CDMA, LTE, WIMAX, DLNA, HDMI, etc. In some embodiments, the telecommunications module 310 includes antennas, filters, low-noise amplifiers, digital-to-analog (DAC) converters, analog-to-digital (ADC) converters, and transceivers. The transceivers may further include circuitry components such as mixers, amplifiers, oscillators, phase-locked loops (PLLs), and/or filters. Some of these electronic circuitry components may be integrated into a single discrete device or an integrated circuit (IC) chip.

The portable electronic device 300 may include a computer memory storage module 320. The memory storage module 320 may contain various forms of digital memory, such as hard disks, FLASH, SRAM, DRAM, ROM, EPROM, memory chips or cartridges, etc. Computer programming code may be permanently or temporarily stored in the memory storage module 320, for example.

The portable electronic device 300 may also include a computer processing module 330. The computer processing module 330 may contain one or more central processing units (CPUs), graphics processing units (GPUs), or digital signal processors (DSPs), which may each be implemented using various digital circuit blocks (including logic gates such as AND, OR, NAND, NOR, XOR gates, etc) along with certain software code. The computer processing module 330 may be used to execute the computer programming code stored in the memory storage module 320.

The portable electronic device 300 may also include an input/output module 340. The input/output module 340 may include one or more touch-sensitive screens, physical and/or virtual buttons (such as power and volume buttons) on or off the touch-sensitive screen, physical and/or virtual keyboards, mouse, track balls, speakers, microphones, light-sensors, light-emitting diodes (LEDs), communications ports (such as USB or HDMI ports), joy-sticks, image-capture devices (for example cameras), etc. In some embodiments, the touch-sensitive screen may be used to display the media program discussed above. User navigation of the media program according to the various embodiments discussed above may also be accomplished using the touch-sensitive screen and/or other components of the input/output module 340.

Figure 22:
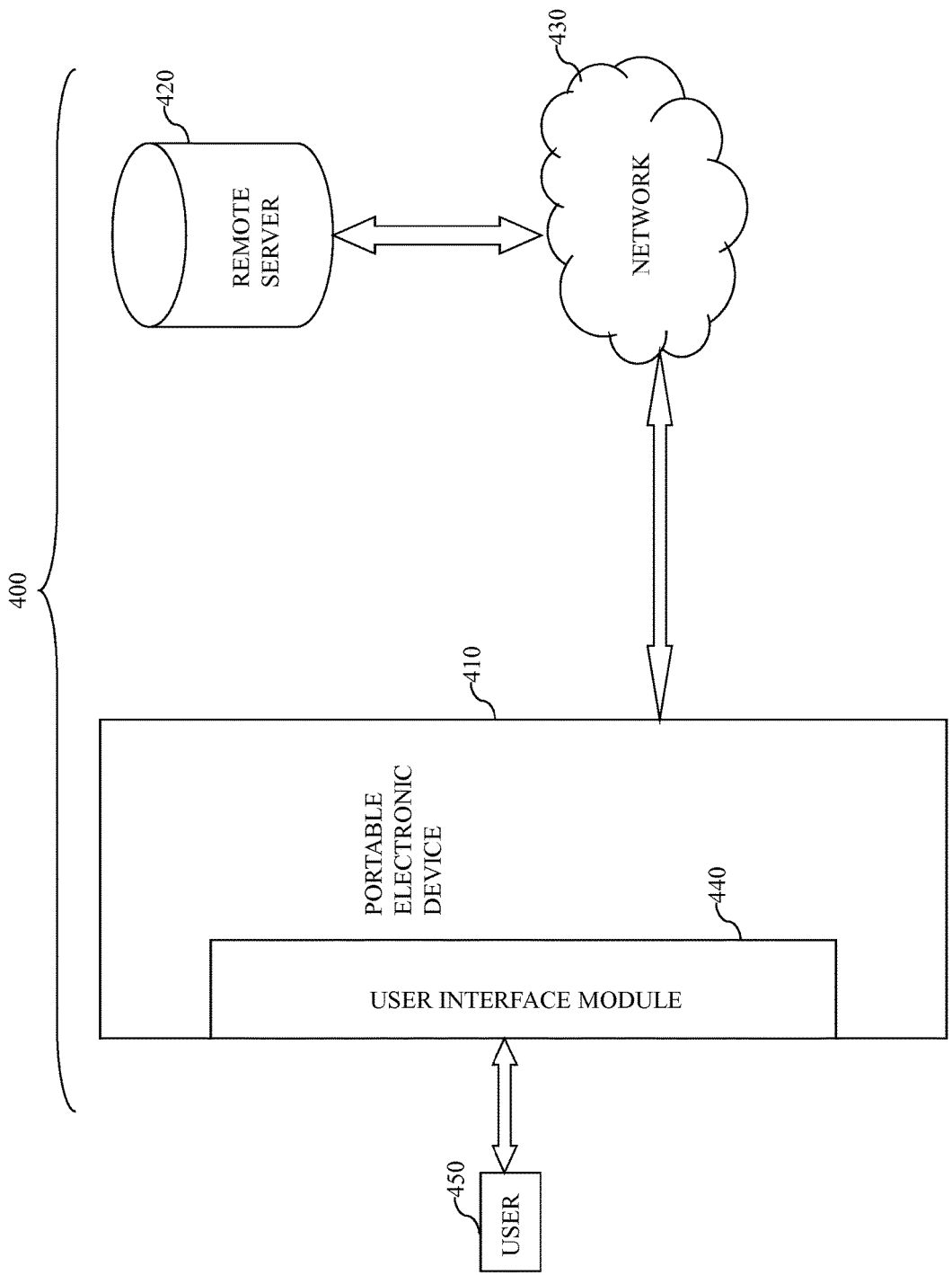
FIG. 22-23 are block diagrams of different embodiments of an example system for displaying and navigating through the media program according to various aspects of the present disclosure.

FIG. 22 is a simplified diagrammatic view of a system 400 that may be used to perform certain aspects of the media program navigation of the present disclosure discussed above. In some embodiments, the system 400 may include the portable electronic device 410. The portable electronic device 410 may be implemented as an embodiment of the portable electronic device 300 of FIG. 21. In some embodiments, the portable electronic device 410 includes a tablet computer or a mobile telephone.

The system 400 also includes a remote server 420. The remote server 420 may be run/hosted/operated by a media service provider such as NETFLIX®, AMAZON®, HULU®, COMCAST, VUDU, REDBOX®, or another suitable media service provider that offer various types of video streaming or downloading services for their subscribers. The remote server 420 may be implemented in a "cloud" computing environment and may include one or more databases that store a plurality of media programs such as movies, documentaries, music videos, podcasts, soundtracks, educational programs, sporting events, artistic performances, or any other type of suitable audio/video digital file that can be played on the portable electronic device 410.

The portable electronic device 410 and the remote server 420 may be communicatively coupled together through a network 430. The network 430 may include cellular towers, routers, switches, hubs, repeaters, storage units, cabling (such as fiber-optic cabling or telephone cabling), and other suitable devices. The network 430 may be implemented using any of the suitable wired or wireless networking protocols. The portable electronic device 410 and the remote server 420 may also be able to communicate with other devices on the network 430 and either carry out instructions received from the network, or send instructions through the network to these external devices to be carried out.

To facilitate user interaction with its offered services, the media servicer provider (that hosts or operates the remote server 420) may provide a user interface module 440. The user interface module 440 may include software programming code and may be installed on the portable electronic device 410 (for example in a memory storage module). In some embodiments, the user interface module 440 may include a downloadable "app", for example an app that is downloadable through a suitable service such as APPLE's® ITUNES®, THE APP STORE® from APPLE®, ANDROID's® PLAY STORE®, AMAZON's®INSTANT VIDEO®, MICROSOFT's® WINDOWS STORE®, RESEARCH IN MOTION's® BLACKBERRY APP WORLD®, etc. In the embodiment shown, the user interface module 440 includes an instance of the "app" that has been downloaded and installed on the portable electronic device 440.

A user 450 may interact with the system 400 by sending instructions to the portable electronic device 410 through the user interface module 440. For example, the user 450 may be a subscriber of the services offered by the service provider running/hosting/operating the remote server 420. The user 450 may attempt to log in to the remote server 420 by launching the "app" of the user interface 440. The user's login credentials are electrically sent to the remote server 420 through the network 430. After verifying the user login credentials, the remote server 420 may instruct the user interface module 440 to display a suitable home screen, through which the user 450 may select a desired media program to watch. The media program selection request from the user 450 is once again sent to the remote server 420 through the network 430. In response to the user selection request, the remote server 420 may begin sending electric packets (of the digital file corresponding to the requested media program) to the portable electronic device 410 through the network 430. As such, the user 450 may be able to stream his target media program of choice. Alternatively, the user 450 may download the selected media program in its entirety and may then play the downloaded media program at any time he wishes. User navigation of the media program according to the embodiments discussed above with reference to FIGS. 1-20 may be implemented through, or as a part of, the user interface module 440.

It is understood that the embodiment of the system 400 shown in FIG. 22 is merely a simplified example of enabling user navigation through a media program and is therefore not intended to be limiting. Other embodiments may be implemented that utilize different types of streaming architectures, or even with no streaming at all. As discussed above, the various aspects of the user navigation through a media program may still apply to media programs that have already been downloaded to a portable electronic device such as the portable electronic device 410 of FIG. 22.

Figure 23:
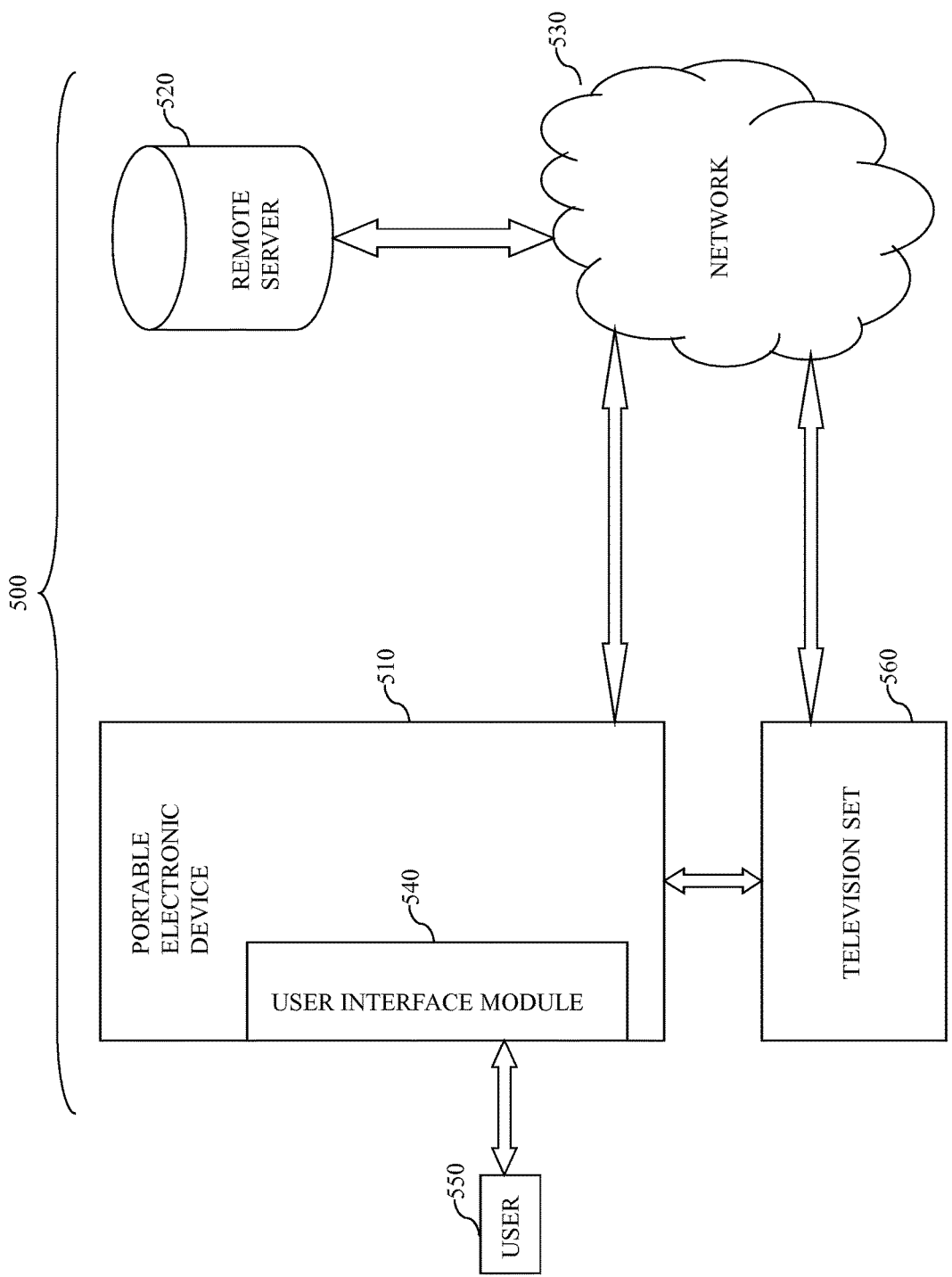

FIG. 23 is a simplified diagrammatic view of another system 500 that may be used to perform certain aspects of the media program navigation of the present disclosure discussed above. The system 500 is similar to the system 400 of FIG. 22 in certain aspects. For example, the system includes a remote server 520 that is similar to the remote server 420, as well as a network 530 that is similar to the network 430. However, in the system 500, the media program is streamed to (or downloaded first and later played on) a television set 560, rather than to the portable electronic device 510. The television set 560 may include components (for example, transceivers) that allow the television set 560 to be communicatively coupled to the portable electronic device and the network 530. The portable electronic device 510 may be configured to control the operation of the television set 560. In that sense, the portable electronic device 510 may be viewed as an enhanced TV remote. The portable electronic device 510 may still be implemented to include a tablet computer or a mobile telephone, or may just include a simple control panel or control pad having a touch screen. An instance of the user interface module 540 may be installed on either the portable electronic device 540 or on the television set 560. Once again, according to various aspects of the present disclosure discussed above with reference to FIGS. 1-20, a user 550 may interact with the portable electronic device 510 to perform various navigational tasks for a media program that is played on the television set 560.

In certain other alternative embodiments, the media program may be downloaded to a storage device (for example on a desktop or a laptop computer) under the user's possession. The storage device may be configured to electronically communicate with the television set 560 and the portable electronic device. Thus, the media program may be streamed to the television set 560 through a local network (which may be implemented as a part of the network 530) from such storage device. Once again, the various aspects of navigation control discussed above may still apply to such set-up.

Figure 24:
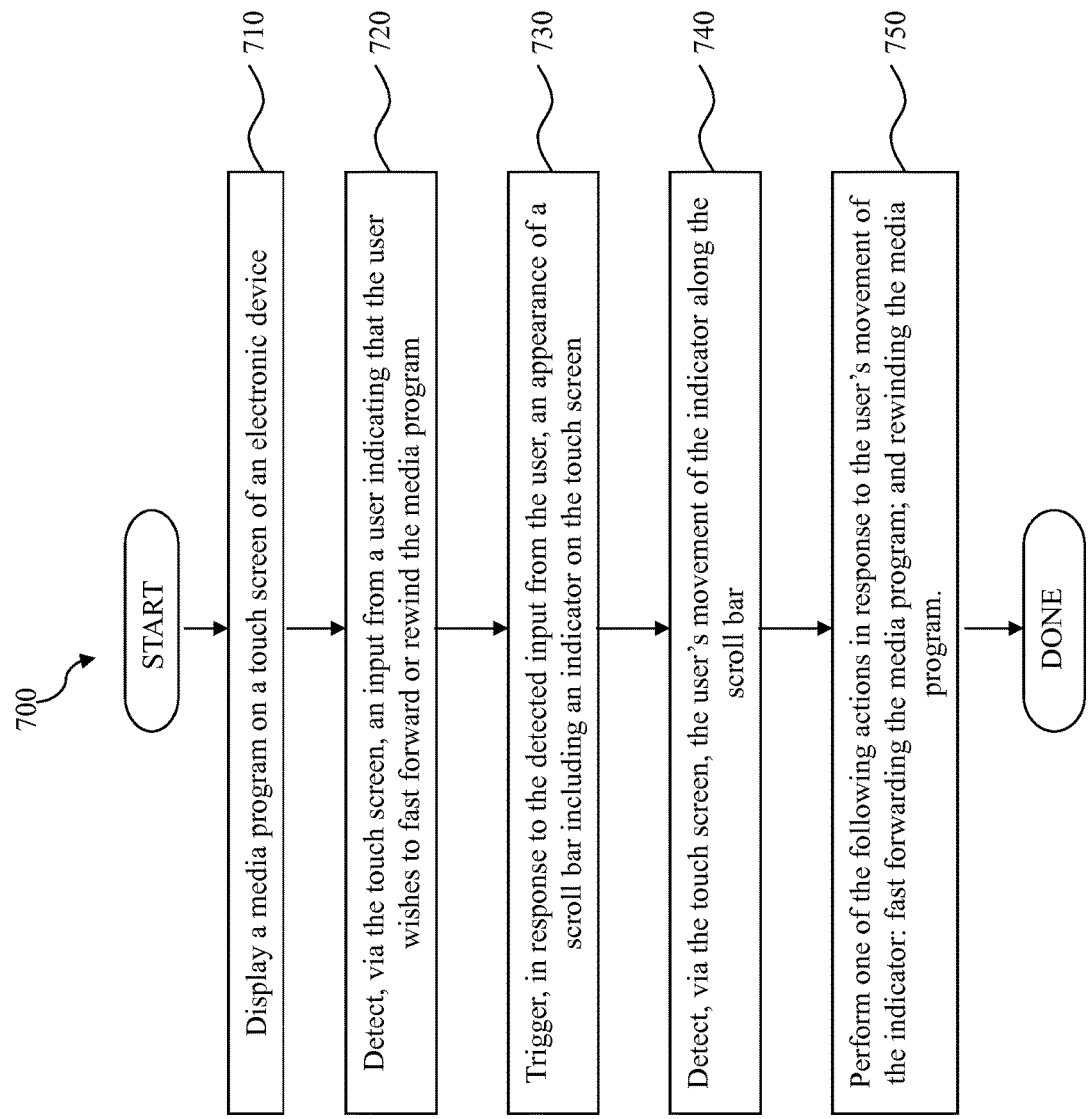
FIG. 24-27 are example methods for displaying and navigating through the media program according to various embodiments of the present disclosure.

FIG. 24 is a flowchart of an example method 700 for managing media playback according to the various aspects of the present disclosure. The method 700 includes a step 710, in which a media program is displayed on a touch screen of an electronic device. In some embodiments, the step 710 is performed by streaming the media program to the electronic device from an online database via a wireless or wired telecommunications protocol. In other embodiments, the step 710 is performed by playing the media program that is stored locally on the electronic device.

The method 700 includes a step 720, in which an input from a user is detected via the touch screen. The input from the user indicates that the user wishes to fast forward or rewind the media program. In some embodiments, the detection of user input includes detecting a press or a click of a virtual button the touch screen. In some embodiments, a plurality of icons is displayed on the touch screen, where the virtual button is one of the icons. The icons are configured to trigger the appearance of the scroll bar in response to a gesture-based user input. The icons each correspond to a respective scroll bar having a different fraction of the total duration of the media program. In other embodiments, the detection of user input includes detecting a voice command from the user.

The method 700 includes a step 730, in which an appearance of a scroll bar including an indicator on the touch screen is triggered in response to the detected input from the user. The indicator is configured to be moved along the scroll bar. A length of the scroll bar represents a predefined amount of time that is a fraction of a total duration of the media program. A position of the indicator relative to the scroll bar corresponds to a time location of the media program. In some embodiments, the triggering includes displaying a plurality of the scroll bars in response to detecting the gesture-based user input for the icons associated with the plurality of the scroll bars discussed above in certain embodiments of the step 720.

In some embodiments, the scroll bar is a second scroll bar and the indicator is a second indicator, and wherein the detecting of step 720 and the triggering of step 730 are performed in a manner to include the following steps:

detecting a user gesture performed on the touch screen;

displaying a first scroll bar including a first indicator on the touch screen, wherein the first indicator is configured to be moved along the first scroll bar, wherein a length of the first scroll bar represents the total duration of the media program;

detecting, via the touch screen, the user's movement of the first indicator along the first scroll bar;

measuring a speed of the first indicator;

performing, if the speed of the first indicator exceeds a predefined reference speed, a fast forwarding or a rewinding of the media program at a rate that is a function of the speed of the first indicator, wherein the fast forwarding or the rewinding is carried out using the first scroll bar and without the second scroll bar; and triggering, if the speed of the first indicator is less than the predefined speed, the appearance of the second scroll bar and the second indicator and thereafter performing a fast forwarding or a rewinding of the media program using the second scroll bar in response to the a detected movement of the second indicator along the second scroll bar.

In some embodiments, the triggering of step 730 is performed in a manner such that the indicator is initially positioned in a center of the scroll bar, and wherein a movement of the indicator in a first direction corresponds to a rewinding of the media program, and wherein a movement of the indicator in a second direction opposite the first direction corresponds to a fast forwarding of the media program.

The method 700 includes a step 740, in which the user's movement of the indicator along the scroll bar is detected via the touch screen.

The method 700 includes a step 750, in which one of the following actions is performed in response to the user's movement of the indicator: fast forwarding the media program; and rewinding the media program.

It is understood that the method may include additional steps performed before, during, or after the steps 710-750 discussed above. However, for the sake of simplicity, these additional steps are not described in detail herein.

Figure 25:
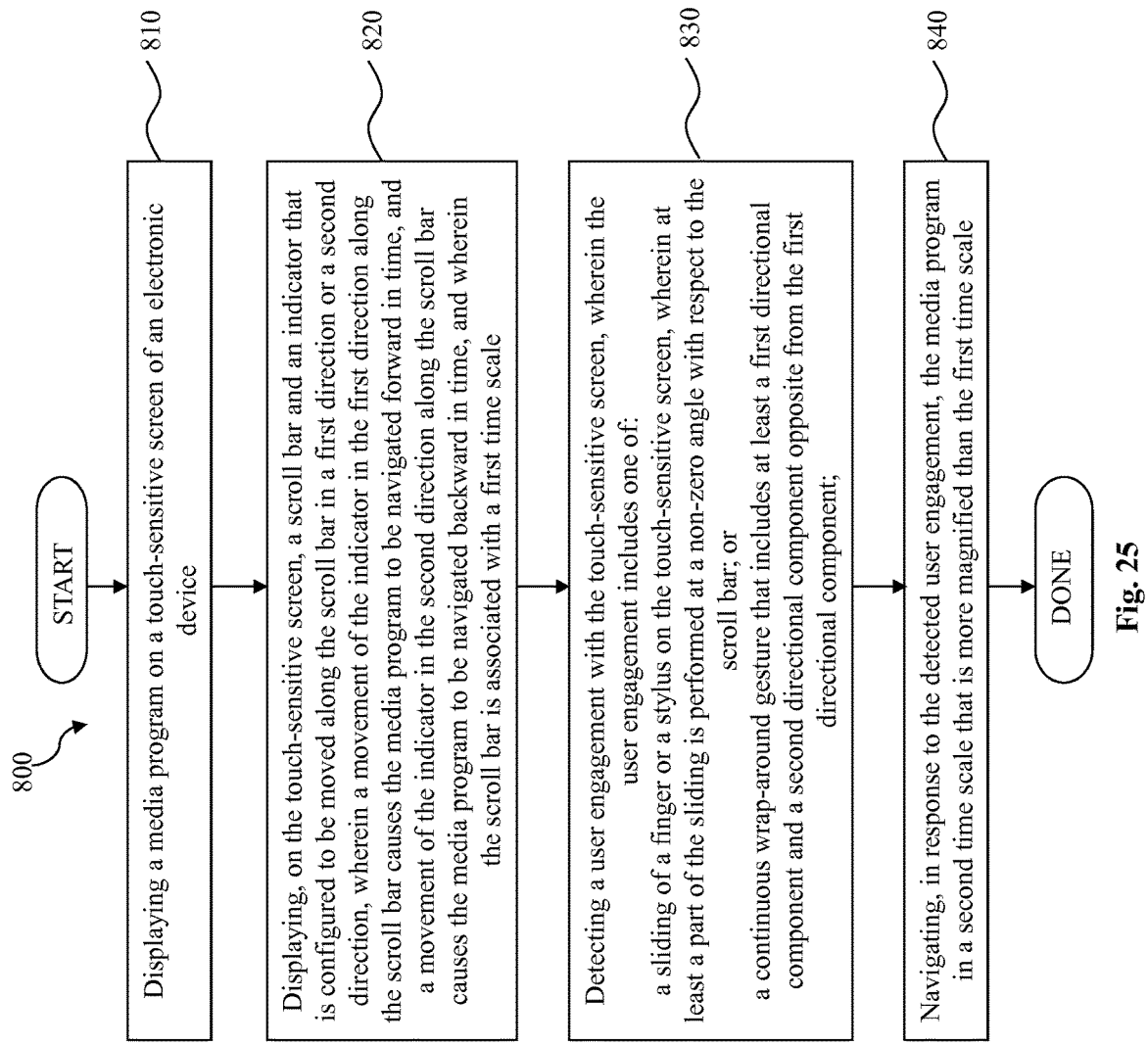

FIG. 25 is a flowchart of an example method 800 for managing media playback according to the various aspects of the present disclosure. The method 800 includes a step 810 of displaying a media program on a touch-sensitive screen of an electronic device.

The method 800 includes a step 820 of displaying, on the touch-sensitive screen, a scroll bar and an indicator that is configured to be moved along the scroll bar in a first direction or a second direction. A movement of the indicator in the first direction along the scroll bar causes the media program to be navigated forward in time, and a movement of the indicator in the second direction along the scroll bar causes the media program to be navigated backward in time. The scroll bar is associated with a first time scale.

The method 800 includes a step 830 of detecting a user engagement with the touch-sensitive screen. The user engagement includes one of: a sliding of a finger or a stylus on the touch-sensitive screen, wherein at least a part of the sliding is performed at a non-zero angle with respect to the scroll bar; or a continuous wrap-around gesture that includes at least a first directional component and a second directional component opposite from the first directional component. In some embodiments, the wrap-around gesture includes more than one loop. In some embodiments, the navigating is performed in the second time scale for as long as the wrap-around gesture is continuous. In some embodiments, the scroll bar is invisible when the sliding or the wrap-around gesture are performed.

The method 800 includes a step 840 of navigating, in response to the detected user engagement, the media program in a second time scale that is more magnified than the first time scale. In some embodiments, the navigating is performed such that an amount of time magnification associated with the second time scale is a function of the angle. In some embodiments, as the angle increases, the amount of time magnification associated with the second time scale increases.

It is understood that the method 800 may include additional steps performed before, during, or after the steps 810-840 discussed above. However, for the sake of simplicity, these additional steps are not described in detail herein.

Figure 26:
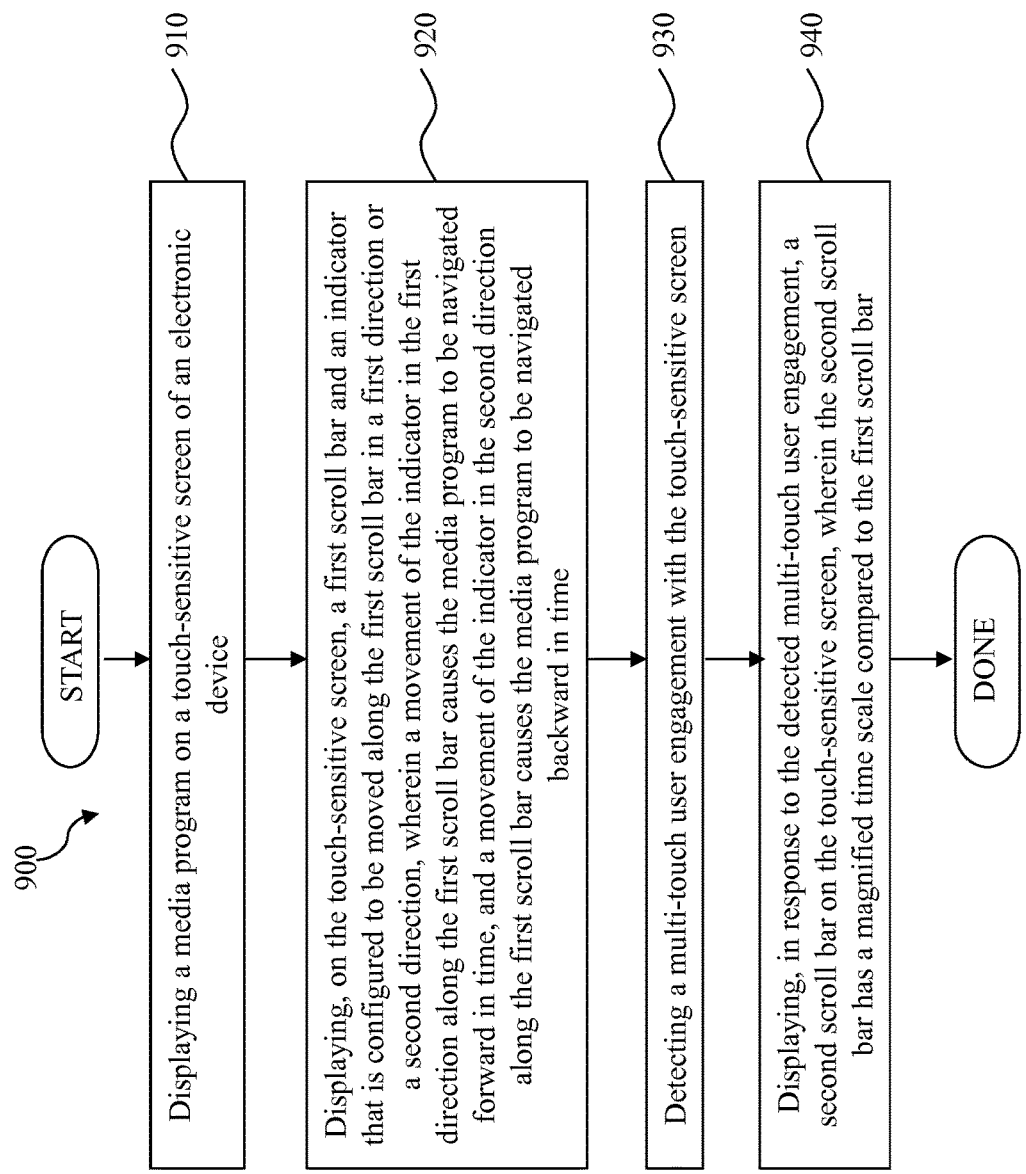

FIG. 26 is a flowchart of an example method 900 for managing media playback according to the various aspects of the present disclosure. The method 900 includes a step 910 of displaying a media program on a touch-sensitive screen of an electronic device.

The method 900 includes a step 920 of displaying, on the touch-sensitive screen, a first scroll bar and an indicator that is configured to be moved along the first scroll bar in a first direction or a second direction. A movement of the indicator in the first direction along the first scroll bar causes the media program to be navigated forward in time, and a movement of the indicator in the second direction along the first scroll bar causes the media program to be navigated backward in time.

The method 900 includes a step 930 of detecting a multi-touch user engagement with the touch-sensitive screen. In some embodiments, the detecting of the multi-touch user engagement comprises detecting a first touch input and a second touch input at a first point and a second point on the first scroll bar, respectively. The first and second points collectively define a segment of the second scroll bar. In some embodiments, the magnified time scale of the second scroll bar is a function of the segment of the second scroll bar. In some embodiments, an amount of time magnification of the second scroll bar with respect to the first scroll bar is equal to: a length of the first scroll bar divided by a length of the segment. In some embodiments, the first touch input and the second touch input are detected substantially simultaneously. In some embodiments, the first touch input is performed with a first finger of the user, and the second touch input is performed with a second finger of the user. In some embodiments, the indicator is disposed between the first point and the second point.

The method 900 includes a step 940 of displaying, in response to the detected multi-touch user engagement, a second scroll bar on the touch-sensitive screen. The second scroll bar has a magnified time scale compared to the first scroll bar.

It is understood that the method 900 may include additional steps performed before, during, or after the steps 910-940 discussed above. For example, the method 900 may include a step of displaying a further indicator on the second scroll bar. The method 900 may further include a step of detecting a movement of the further indicator in the first direction or the second direction along the second scroll bar. The method 900 may also include a step of navigating the media program forward in the magnified time scale in response to a detected movement of the further indicator in the first direction along the second scroll bar. The method 900 may further include a step of navigating the media program backward in the magnified time scale in response to a detected movement of the further indicator in the second direction along the second scroll bar. For reasons of simplicity, these additional steps and other additional steps are not specifically illustrated or described in detail herein.

Figure 27:
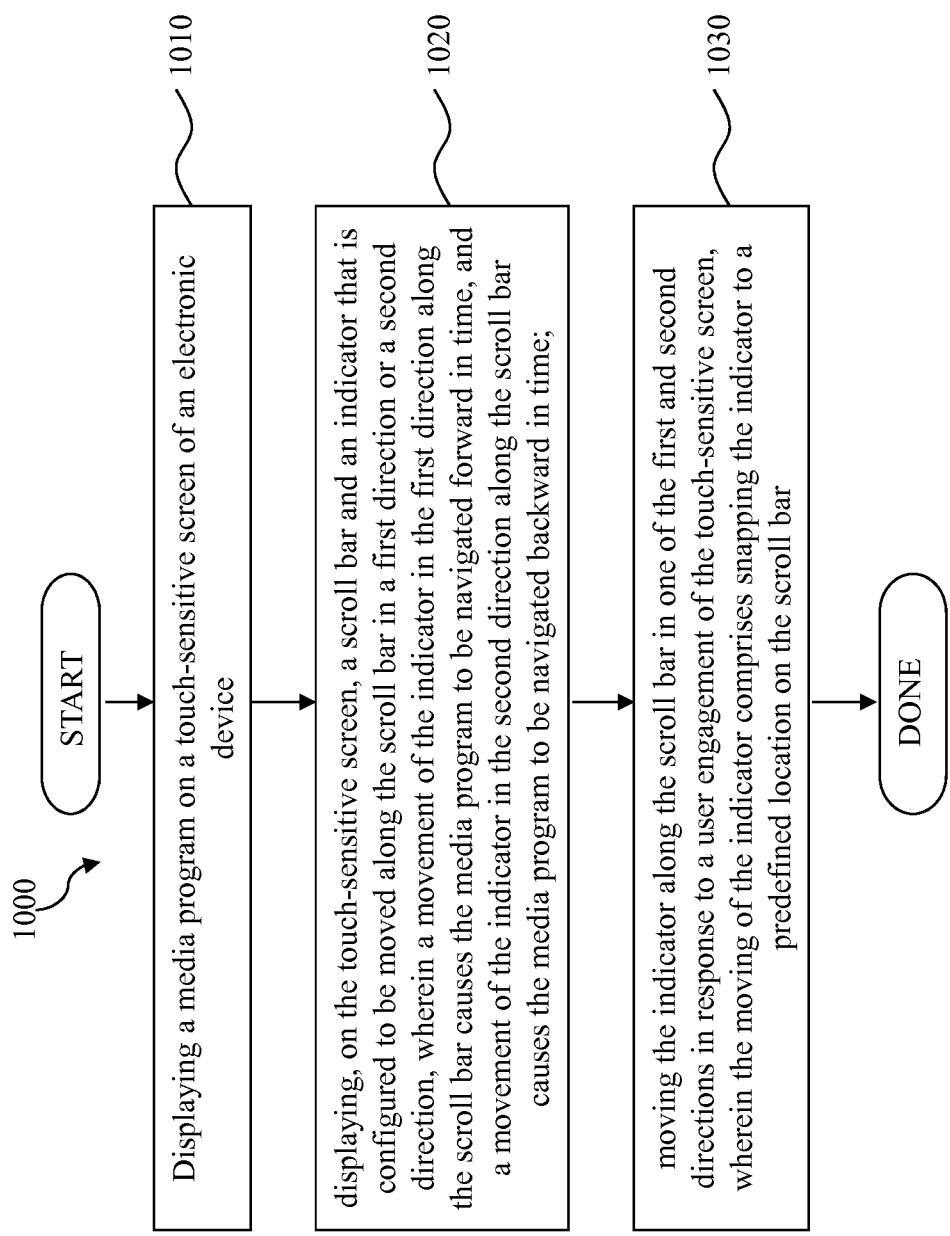

FIG. 27 is a flowchart of an example method 1000 for managing media playback according to the various aspects of the present disclosure. The method 1000 includes a step 1010 of displaying a media program on a touch-sensitive screen of an electronic device.

The method 1000 includes a step 1020 of displaying, on the touch-sensitive screen, a scroll bar and an indicator that is configured to be moved along the scroll bar in a first direction or a second direction. A movement of the indicator in the first direction along the scroll bar causes the media program to be navigated forward in time, and a movement of the indicator in the second direction along the scroll bar causes the media program to be navigated backward in time.

The method 1000 includes a step 1030 of moving the indicator along the scroll bar in one of the first and second directions in response to a user engagement of the touch-sensitive screen. The moving of the indicator comprises snapping the indicator to a predefined location on the scroll bar. In some embodiments, the snapping comprises: temporarily pausing the indicator at the predefined location. In some embodiments, the moving comprises: after the temporary pausing of the indicator, moving the indicator past the predefined location in response to a continuous user engagement of the touch-sensitive screen. In some embodiments, the user engagement of the touch-sensitive screen comprises dragging, via a finger or a stylus, the indicator along the scroll bar.

In some embodiments, the media program is divided into a plurality of chapters, and wherein the predefined location corresponds to a beginning of one of the chapters. In some embodiments, the predefined location corresponds to a beginning of a user-defined favorite scene of the media program. In some embodiments, the scroll bar has a magnified time-scale such that a length of the scroll bar corresponds to a portion, but not all, of a total time duration of the media program. In some embodiments, the snapping of the indicator comprises: detecting that the indicator is in proximity of the predefined location; and moving the indicator suddenly toward the predefined location until the indicator lands on the predefined location. In some embodiments, the snapping of the indicator comprises communicating, via an audible alert or a haptic feedback, that the indicator has been snapped to the predefined location. In some embodiments, the moving of the indicator is performed such that a snapping of the indicator to the predefined location on the scroll bar does not prevent the indicator from being moved along the scroll bar beyond the predefined location.

It is understood that the method 1000 may include additional steps performed before, during, or after the steps 1010-1030 discussed above. For example, the method 1000 may include a step of generating a plurality of predefined locations that includes the predefined location. In some embodiments, the generating is performed in response to a request from a user. In some embodiments, the method 1000 may further include a step of updating the displaying of the media program in response to the moving of the indicator. The updating comprises: in response to the indicator being snapped to the predefined location, displaying a scene of the media program corresponding to the predefined location on the scroll bar. For reasons of simplicity, these additional steps and other additional steps are not specifically illustrated or described in detail herein.

One of the broader forms of the present disclosure involves an electronic device. The electronic device includes: a touchscreen configured to receive gestured-based input from a user; a memory storage component configured to store computer programming code; and a computer processor configured to execute the computer programming code to perform the following: displaying a media program on the touch screen; detecting, via the touch screen, the gesture-based input from the user indicating that the user wishes to fast forward or rewind the media program; and triggering, in response to the detected input from the user, an appearance of a scroll bar including an indicator on the touch screen; wherein: the indicator is configured to be moved along the scroll bar; a length of the scroll bar represents a predefined amount of time that is a fraction of a total duration of the media program; and a position of the indicator relative to the scroll bar corresponds to a time location of the media program.

In some embodiments, the computer programming code, when executed, further performs: detecting, via the touch screen, the user's movement of the indicator along the scroll bar; and performing one of the following actions in response to the user's movement of the indicator: fast forwarding the media program; and rewinding the media program.

In some embodiments, the computer programming code for performing the fast forwarding and the rewinding include computer programming code for executing the fast forwarding and the rewinding in a manner such that scenes from the media program continue to be displayed on the touch screen during the fast forwarding and the rewinding of the media program.

In some embodiments, the computer programming code for performing the displaying the media program includes computer programming code for performing one of: streaming the media program to the electronic device from an online database via a wireless or wired telecommunications protocol; and playing the media program that is stored locally on the electronic device.

In some embodiments, the computer programming code for performing the detecting the input from the user includes computer programming code for detecting a press of a virtual button on the touch screen.

In some embodiments, the computer programming code, when executed, further perform: displaying a plurality of icons on the touch screen, the virtual button being one of the icons; wherein: the icons are configured to trigger the appearance of the scroll bar in response to a gesture-based user input; and the icons each correspond to a respective scroll bar having a different fraction of the total duration of the media program.

In some embodiments, the computer programming code for the triggering comprises computer programming code for displaying a plurality of the scroll bars in response to detecting the gesture-based user input for the icons associated with the plurality of the scroll bars.

In some embodiments, the scroll bar is a second scroll bar and the indicator is a second indicator, and wherein the computer programming code for performing the detecting and the triggering include computer programming code for performing the following steps: detecting a user gesture performed on the touch screen; displaying a first scroll bar including a first indicator on the touch screen, wherein the first indicator is configured to be moved along the first scroll bar, wherein a length of the first scroll bar represents the total duration of the media program; detecting, via the touch screen, the user's movement of the first indicator along the first scroll bar; measuring a speed of the first indicator; performing, if the speed of the first indicator exceeds a predefined reference speed, a fast forwarding or a rewinding of the media program at a rate that is a function of the speed of the first indicator, wherein the fast forwarding or the rewinding is carried out using the first scroll bar and without the second scroll bar; and triggering, if the speed of the first indicator is less than the predefined speed, the appearance of the second scroll bar and the second indicator and thereafter performing a fast forwarding or a rewinding of the media program using the second scroll bar in response to the a detected movement of the second indicator along the second scroll bar.

In some embodiments, the computer programming code for triggering the appearance of the scroll bar includes computer programming code for: displaying the indicator in a center of the scroll bar as an initial position of the indicator; rewinding the media program in response to a movement of the indicator in a first direction; and fast forwarding the media program in response to a movement of the indicator in a second direction opposite the first direction.

Another one of the broader forms of the present disclosure involves a method of managing media playback. The method includes: displaying a media program on a touch screen of an electronic device; detecting, via the touch screen, an input from a user indicating that the user wishes to fast forward or rewind the media program; and triggering, in response to the detected input from the user, an appearance of a scroll bar including an indicator on the touch screen; wherein: the indicator is configured to be moved along the scroll bar; a length of the scroll bar represents a predefined amount of time that is a fraction of a total duration of the media program; and a position of the indicator relative to the scroll bar corresponds to a time location of the media program.

In some embodiments, the method further includes: detecting, via the touch screen, the user's movement of the indicator along the scroll bar; and performing one of the following actions in response to the user's movement of the indicator: fast forwarding the media program; and rewinding the media program.

In some embodiments, the fast forwarding and the rewinding are performed in a manner such that scenes from the media program continue to be displayed on the touch screen during the fast forwarding and the rewinding of the media program.

In some embodiments, the displaying the media program includes one of: streaming the media program to the electronic device from an online database via a wireless or wired telecommunications protocol; and playing the media program that is stored locally on the electronic device.

In some embodiments, the detecting the input from the user indicating that the user wishes to fast forward or rewind the media program includes detecting a press of a virtual button on the touch screen.

In some embodiments, the method further includes: displaying a plurality of icons on the touch screen, the virtual button being one of the icons; wherein: the icons are configured to trigger the appearance of the scroll bar in response to a gesture-based user input; and the icons each correspond to a respective scroll bar having a different fraction of the total duration of the media program.

In some embodiments, the triggering comprises displaying a plurality of the scroll bars in response to detecting the gesture-based user input for the icons associated with the plurality of the scroll bars.

In some embodiments, the scroll bar is a second scroll bar and the indicator is a second indicator, and wherein the detecting and the triggering are performed in a manner to include the following steps: detecting a user gesture performed on the touch screen; displaying a first scroll bar including a first indicator on the touch screen, wherein the first indicator is configured to be moved along the first scroll bar, wherein a length of the first scroll bar represents the total duration of the media program; detecting, via the touch screen, the user's movement of the first indicator along the first scroll bar; measuring a speed of the first indicator; performing, if the speed of the first indicator exceeds a predefined reference speed, a fast forwarding or a rewinding of the media program at a rate that is a function of the speed of the first indicator, wherein the fast forwarding or the rewinding is carried out using the first scroll bar and without the second scroll bar; and triggering, if the speed of the first indicator is less than the predefined speed, the appearance of the second scroll bar and the second indicator and thereafter performing a fast forwarding or a rewinding of the media program using the second scroll bar in response to the a detected movement of the second indicator along the second scroll bar.

In some embodiments, the triggering the appearance of the scroll bar is performed in a manner such that the indicator is initially positioned in a center of the scroll bar, and wherein a movement of the indicator in a first direction corresponds to a rewinding of the media program, and wherein a movement of the indicator in a second direction opposite the first direction corresponds to a fast forwarding of the media program.

One more of the broader forms of the present disclosure involves a system for playing digital media. The system includes: a computer database configured to electronically stores a plurality of media programs each in a digital format; and a user interface module installed on a portable touch screen electronic device located remotely from the computer database, wherein the portable touch screen electronic device is configured to communicate with the computer database via a wireless or wired telecommunications protocol, and wherein the user interface module contains computer programming instructions, that when executed, perform the following tasks: displaying a media program on a touch screen of an electronic device; detecting, via the touch screen, an input from a user indicating that the user wishes to fast forward or rewind the media program; and triggering, in response to the detected input from the user, an appearance of a scroll bar including an indicator on the touch screen; wherein: the indicator is configured to be moved along the scroll bar; a length of the scroll bar represents a predefined amount of time that is a fraction of a total duration of the media program; and a position of the indicator relative to the scroll bar corresponds to a time location of the media program.

In some embodiments, the user interface module contains computer programming code, that when executed, performs the further tasks: detecting, via the touch screen, the user's movement of the indicator along the scroll bar; and performing one of the following actions in response to the user's movement of the indicator: fast forwarding the media program; and rewinding the media program.

In some embodiments, the computer code of the user interface module, when executed, performs the fast forwarding and the rewinding in a manner such that scenes from the media program continue to be displayed on the touch screen during the fast forwarding and the rewinding of the media program.

In some embodiments, the computer code of the user interface module, when executed, performs the displaying the media program by one of: streaming the media program to the electronic device from an online database via a wireless or wired telecommunications protocol; and playing the media program that is stored locally on the electronic device.

In some embodiments, the computer code of the user interface module, when executed, performs the detecting the input from the user to include detecting a press of a virtual button on the touch screen.

In some embodiments, the computer code of the user interface module, when executed, performs the further tasks: displaying a plurality of icons on the touch screen, the virtual button being one of the icons; wherein: the icons are configured to trigger the appearance of the scroll bar in response to a gesture-based user input; and the icons each correspond to a respective scroll bar having a different fraction of the total duration of the media program.

In some embodiments, the computer code of the user interface module, when executed, performs the triggering to include displaying a plurality of the scroll bars in response to detecting the gesture-based user input for the icons associated with the plurality of the scroll bars.

In some embodiments, the scroll bar is a second scroll bar and the indicator is a second indicator, and wherein the computer code of the user interface module, when executed, perform the detecting and the triggering in a manner to include the following steps: detecting a user gesture performed on the touch screen; displaying a first scroll bar including a first indicator on the touch screen, wherein the first indicator is configured to be moved along the first scroll bar, wherein a length of the first scroll bar represents the total duration of the media program; detecting, via the touch screen, the user's movement of the first indicator along the first scroll bar; measuring a speed of the first indicator; performing, if the speed of the first indicator exceeds a predefined reference speed, a fast forwarding or a rewinding of the media program at a rate that is a function of the speed of the first indicator, wherein the fast forwarding or the rewinding is carried out using the first scroll bar and without the second scroll bar; and triggering, if the speed of the first indicator is less than the predefined speed, the appearance of the second scroll bar and the second indicator and thereafter performing a fast forwarding or a rewinding of the media program using the second scroll bar in response to the a detected movement of the second indicator along the second scroll bar.

In some embodiments, the computer code of the user interface module, when executed, performs the triggering the appearance of the scroll bar in a manner such that the indicator is initially positioned in a center of the scroll bar, and wherein a movement of the indicator in a first direction corresponds to a rewinding of the media program, and wherein a movement of the indicator in a second direction opposite the first direction corresponds to a fast forwarding of the media program.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
   displaying a media program on a touch-sensitive screen of an electronic device;
   displaying, on the touch-sensitive screen, a scroll bar and an indicator that is configured to be moved along the scroll bar in a first direction or a second direction, wherein a movement of the indicator in the first direction along the scroll bar causes the media program to be navigated forward in time, and a movement of the indicator in the second direction along the scroll bar causes the media program to be navigated backward in time;
   detecting a first sliding gesture performed on the touch-sensitive screen, wherein the first sliding gesture is performed with a first non-zero angle with respect to the scroll bar;
   navigating, in response to the detecting of the first sliding gesture, through the media program in a first time scale having a first amount of time magnification;
   detecting a second sliding gesture performed on the touch-sensitive screen, wherein the second sliding gesture is performed with a second non-zero angle with respect to the scroll bar, the second non-zero angle being different from the first non-zero angle; and
   navigating, in response to the detecting of the second sliding gesture, through the media program in a second time scale having a second amount of time magnification that is different from the first amount of time magnification.

2. The method of claim 1, further comprising: moving the indicator along the scroll bar in one of the first and second directions in response to a user engagement of the touch-sensitive screen, wherein the moving of the indicator comprises snapping the indicator to a predefined location on the scroll bar, wherein the snapping comprises: temporarily pausing the indicator at the predefined location.

3. The method of claim 2, wherein the moving comprises: after the temporarily pausing of the indicator, moving the indicator past the predefined location in response to a continuous user engagement of the touch-sensitive screen, and wherein the user engagement of the touch-sensitive screen comprises dragging, via a finger or a stylus, the indicator along the scroll bar.

4. The method of claim 2, wherein the snapping of the indicator comprises communicating, via an audible alert or a haptic feedback, that the indicator has been snapped to the predefined location.

5. The method of claim 2, wherein the snapping of the indicator comprises:
   detecting that the indicator is in proximity of the predefined location; and
   moving the indicator suddenly toward the predefined location until the indicator lands on the predefined location.

6. The method of claim 2, wherein the media program includes a plurality of predefined chapters or a plurality of user-defined favorite scenes, and wherein the predefined location corresponds to one of: a beginning of one of the predefined chapters or a beginning of one of the user-defined favorite scenes.

7. The method of claim 1, wherein the first sliding gesture and the second sliding gesture are performed consecutively.

8. An electronic device, comprising:
   a touch-sensitive screen configured to receive gestured-based input from a user;
   a memory storage component configured to store computer programming code; and
   a computer processor configured to execute the computer programming code to perform the following operations:
      displaying a media program on the touch-sensitive screen;
      displaying, on the touch-sensitive screen, a scroll bar and an indicator that is configured to be moved along the scroll bar in a first direction or a second direction, wherein a movement of the indicator in the first direction along the scroll bar causes the media program to be navigated forward in time, and a movement of the indicator in the second direction along the scroll bar causes the media program to be navigated backward in time;
      detecting a first sliding gesture performed on the touch-sensitive screen, wherein the first sliding gesture is performed with a first non-zero angle with respect to the scroll bar;
      navigating, in response to the detecting of the first sliding gesture, through the media program in a first time scale having a first amount of time magnification;
      detecting a second sliding gesture performed on the touch-sensitive screen, wherein the second sliding gesture is performed with a second non-zero angle with respect to the scroll bar, the second non-zero angle being different from the first non-zero angle; and
      navigating, in response to the detecting of the second sliding gesture, through the media program in a second time scale having a second amount of time magnification that is different from the first amount of time magnification.

9. The electronic of claim 8, wherein the operations further comprise: moving the indicator along the scroll bar in one of the first and second directions in response to a user engagement of the touch-sensitive screen, wherein the moving of the indicator comprises snapping the indicator to a predefined location on the scroll bar, wherein the snapping comprises: temporarily pausing the indicator at the predefined location.

10. The electronic of claim 9, wherein the moving comprises: after the temporarily pausing of the indicator, moving the indicator past the predefined location in response to a continuous user engagement of the touch-sensitive screen, and wherein the user engagement of the touch-sensitive screen comprises dragging, via a finger or a stylus, the indicator along the scroll bar.

11. The electronic of claim 9, wherein the snapping of the indicator comprises communicating, via an audible alert or a haptic feedback, that the indicator has been snapped to the predefined location.

12. The electronic of claim 9, wherein the snapping of the indicator comprises:
   detecting that the indicator is in proximity of the predefined location; and
   moving the indicator suddenly toward the predefined location until the indicator lands on the predefined location.

13. The electronic of claim 9, wherein the media program includes a plurality of predefined chapters or a plurality of user-defined favorite scenes, and wherein the predefined location corresponds to one of: a beginning of one of the predefined chapters or a beginning of one of the user-defined favorite scenes.

14. The electronic of claim 8, wherein the first sliding gesture and the second sliding gesture are performed consecutively.

15. A system for playing digital media, comprising:
   a computer database configured to electronically store a plurality of media programs each in a digital format; and
   a user interface module installed on a portable electronic device having a touch-sensitive screen and located remotely from the computer database, wherein the portable electronic device is configured to communicate with the computer database via a wireless or wired telecommunications protocol, and wherein the user interface module contains computer programming instructions, that when executed, perform the following tasks:
      displaying a media program on the touch-sensitive screen, the media program being one of the plurality of media programs stored in the computer database;
      displaying, on the touch-sensitive screen, a scroll bar and an indicator that is configured to be moved along the scroll bar in a first direction or a second direction, wherein a movement of the indicator in the first direction along the scroll bar causes the media program to be navigated forward in time, and a movement of the indicator in the second direction along the scroll bar causes the media program to be navigated backward in time;
      detecting a first sliding gesture performed on the touch-sensitive screen, wherein the first sliding gesture is performed with a first non-zero angle with respect to the scroll bar;
      navigating, in response to the detecting of the first sliding gesture, through the media program in a first time scale having a first amount of time magnification;
      detecting a second sliding gesture performed on the touch-sensitive screen, wherein the second sliding gesture is performed with a second non-zero angle with respect to the scroll bar, the second non-zero angle being different from the first non-zero angle; and
      navigating, in response to the detecting of the second sliding gesture, through the media program in a second time scale having a second amount of time magnification that is different from the first amount of time magnification.

16. The system of claim 15, wherein the tasks further comprise: moving the indicator along the scroll bar in one of the first and second directions in response to a user engagement of the touch-sensitive screen, wherein the moving of the indicator comprises snapping the indicator to a predefined location on the scroll bar, wherein the snapping comprises: temporarily pausing the indicator at the predefined location.

17. The system of claim 16, wherein the moving comprises: after the temporarily pausing of the indicator, moving the indicator past the predefined location in response to a continuous user engagement of the touch-sensitive screen, and wherein the user engagement of the touch-sensitive screen comprises dragging, via a finger or a stylus, the indicator along the scroll bar.

18. The system of claim 16, wherein the snapping of the indicator comprises communicating, via an audible alert or a haptic feedback, that the indicator has been snapped to the predefined location.

19. The system of claim 16, wherein the snapping of the indicator comprises:
   detecting that the indicator is in proximity of the predefined location; and
   moving the indicator suddenly toward the predefined location until the indicator lands on the predefined location.

20. The system of claim 16, wherein the media program includes a plurality of predefined chapters or a plurality of user-defined favorite scenes, and wherein the predefined location corresponds to one of: a beginning of one of the predefined chapters or a beginning of one of the user-defined favorite scenes.

* * * * *